US010776463B2

(12) United States Patent
Stavrou et al.

(10) Patent No.: US 10,776,463 B2
(45) Date of Patent: *Sep. 15, 2020

(54) ACTIVE AUTHENTICATION OF USERS

(71) Applicant: KRYPTOWIRE LLC, McLean, VA (US)

(72) Inventors: Angelos Stavrou, Fairfax, VA (US); Rahul Murmuria, Burke, VA (US); Ryan Johnson, Warrenton, VA (US); Daniel Barbara, Reston, VA (US)

(73) Assignee: KRYPTOWIRE LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,829

(22) Filed: Mar. 11, 2019

(65) Prior Publication Data

US 2019/0205514 A1 Jul. 4, 2019

Related U.S. Application Data

(63) Continuation of application No. 15/236,049, filed on Aug. 12, 2016, now Pat. No. 10,289,819.

(Continued)

(51) Int. Cl.
*G06F 21/31* (2013.01)
*G06N 20/00* (2019.01)
(Continued)

(52) U.S. Cl.
CPC ............ *G06F 21/316* (2013.01); *G06F 21/32* (2013.01)

(58) Field of Classification Search
None
See application file for complete search history.

(56) References Cited

U.S. PATENT DOCUMENTS

| 5,229,764 A | 7/1993 | Matchett et al. |
| 6,334,121 B1 * | 12/2001 | Primeaux ............ G06F 21/552 |
| | | 706/52 |

(Continued)

OTHER PUBLICATIONS

Terence Sim, Rajkumar Janakiraman and Sandeep Kumar,Continuous Verification Using Multimodal Biometrics, Apr. 2007, IEEE Transactions on Pattern Analysis and Machine Intelligence, vol. 29, No. 4, pp. 687-700 (Year: 2007).*

(Continued)

*Primary Examiner* — Kambiz Zand
*Assistant Examiner* — Arezoo Sherkat
(74) *Attorney, Agent, or Firm* — Mannava & Kang, P.C.; Vinay Malik

(57) ABSTRACT

Embodiments herein disclose a method and system for authenticating users of an electronic device. In an example, data pertaining to a user of the electronic device is collected for authentication. The data is data indicative of an interaction behavior of the user with the electronic device. A deviation of the collected data from a behavior model of the user is checked. To generate the behavior model, data from multiple users is collected to create the behavior model corresponding to each of the users, each behavior model is indicative of data uncommon between the user corresponding to the behavior model and other users in the plurality of users to separate the user corresponding to the behavior model from other users in the multiple users. Further, an access control policy is enforced on the electronic device, based on the deviation of the collected data from the behavior model of the user.

16 Claims, 15 Drawing Sheets

Related U.S. Application Data

(60) Provisional application No. 62/204,056, filed on Aug. 12, 2015.

(51) Int. Cl.
    *G06F 21/32* (2013.01)
    *G06F 21/55* (2013.01)

(56) References Cited

U.S. PATENT DOCUMENTS

| | | | | |
|---|---|---|---|---|
| 7,492,943 | B2* | 2/2009 | Li | G06K 9/00288 382/115 |
| 8,255,698 | B2* | 8/2012 | Li | G06F 21/32 455/433 |
| 8,862,551 | B2* | 10/2014 | Lim | G06F 21/6218 707/648 |
| 9,357,391 | B1 | 5/2016 | Alsvig et al. | |
| 9,753,796 | B2* | 9/2017 | Mahaffey | H04L 41/142 |
| 9,843,596 | B1* | 12/2017 | Averbuch | H04L 63/1416 |
| 10,367,842 | B2* | 7/2019 | Chen | H04L 63/1425 |
| 2006/0093208 | A1* | 5/2006 | Li | G06K 9/00288 382/159 |
| 2007/0156696 | A1* | 7/2007 | Lim | G06F 21/6218 |
| 2008/0059474 | A1* | 3/2008 | Lim | G06F 21/604 |
| 2008/0097938 | A1* | 4/2008 | Guyon | G06K 9/6231 706/12 |
| 2010/0299292 | A1* | 11/2010 | Collazo | G06F 21/577 706/14 |
| 2011/0004575 | A1* | 1/2011 | Yang | G06F 1/3203 706/12 |
| 2011/0088039 | A1* | 4/2011 | Tabone | G06F 21/6218 718/104 |
| 2012/0137367 | A1* | 5/2012 | Dupont | G06F 21/00 726/25 |
| 2013/0167221 | A1 | 6/2013 | Vukoszavlyev et al. | |
| 2013/0262891 | A1* | 10/2013 | Gudlavenkatasiva | G06F 1/3212 713/320 |
| 2013/0288647 | A1* | 10/2013 | Turgeman | G06F 3/041 455/411 |
| 2013/0318607 | A1 | 11/2013 | Reed et al. | |
| 2014/0096249 | A1* | 4/2014 | Dupont | G06F 21/00 726/23 |
| 2014/0201120 | A1 | 7/2014 | Lydon et al. | |
| 2015/0163121 | A1* | 6/2015 | Mahaffey | G06F 11/0709 707/687 |
| 2015/0356286 | A1 | 12/2015 | Quirk et al. | |
| 2016/0021081 | A1* | 1/2016 | Caceres | H04L 63/08 726/7 |
| 2016/0050217 | A1* | 2/2016 | Mare | H04L 9/3215 726/4 |
| 2016/0050589 | A1* | 2/2016 | Safavi | H04W 36/0033 455/436 |
| 2016/0073351 | A1* | 3/2016 | Cardozo | H04W 52/0258 455/574 |
| 2016/0150072 | A1* | 5/2016 | Rangarajan | H04W 52/0254 455/574 |
| 2017/0003984 | A1* | 1/2017 | Gatson | G06F 9/44505 |
| 2017/0017760 | A1 | 1/2017 | Freese et al. | |
| 2019/0158994 | A1* | 5/2019 | Gross | H04W 4/025 |

OTHER PUBLICATIONS

Emily Reynolds, "Google wants to replace your password with a 'trust score'", May 25, 2016, 3 pages, Wired Google. http://www.wired.co.uk/article/google-passwords-trust-score.

Angelos Stavrou et al., "Power—touch—movement fusion for active authentication", Report documentation page Jan. 22, 2014, 32 pages, Kryptowire LLC, Fairfax, Virginia, USA.

Angelos Stavrou et al., "Computing individualized features and modalities to boost active authentication", Report documentation page, Apr. 11, 2016, 31 pages, Kryptowire LLC, Fairfax, Virginia, USA.

Unknown, "Quo Vandis, a Framework for mobile device and user authentication", Monthly Research and Development (R&D) Technical Status Report, Jan. 2016, 5 pages, Kryptowire LLC, Fairfax, Virginia, USA.

Angelos Stavrou et al., "Computing individualized features and modalities", AAPI Meeting, Aug. 2015, 26 pages, Kryptowire LLC, Fairfax, Virginia, USA.

Anonymous, "Continous authentication on mobile devices using power consumption, touch gestures and physical movement of users", 20 pages.

Rahul Murmuria, "Continuous authentication on smart phones using user behavior", Dissertation Proposal, 2015, 59 pages, George Mason University, Fairfax Virginia, USA.

Rahul Murmuria, "Continuous authentication on smart phones using user behavior", Dissertation Proposal Presentation, 2015, 34 pages, George Mason University, Fairfax Virginia, USA.

Rahul Murmuria et al., "Authentication feature and model selection using penalty algorithms", Symposium on Usable Privacy and Security, Jun. 22-24, 2016, 2 pages, Denver, Colorado, USA.

Daniel Barbara et al., "Detecting Outliers using Transduction and Statistical Testing", Research Track Paper, Aug. 20-23, 2006, 10 pages, Philadelphia, Pennsylvania, USA.

Markus M. Breunig et al., "LOF: Identifying Density-Based Local Outliers", 2000, 12 pages, Dallas, Texas, USA.

A. Gammerman et al., "Learning by transduction", 1998, 8 pages, UK.

Markus Goldstein et al., "FastLOF: An Expectation-Maximization based Local Outlier Detection Algorithm", Conference paper, Nov. 2012, 5 pages.

Kevin S. Killourhy et al., "Comparing Anomaly-Detection Algorithms for Keystroke Dynamics", 2009, 10 pages, Pittsburgh, Pennsylvania, USA.

Hans-Peter Kriegel, "LoOP: Local Outlier Probabilities", Nov. 2-6, 2009, 4 pages, Hong Kong, China.

Erich Schubert et al., "Local outlier detection reconsidered: a generalized view on locality with applications to spatial, video and network outlier detection", Data Mining Knowledge Discovery, Dec. 18, 2012, vol. 1, No. 28, 190-237 (48 pages), Springer, USA.

Volodya Vovk et al., "Machine-Learning applications of algorithmic randomness", 1999, 10 pages, London, England.

Ahmed Awad E., "A new biometric technology based on mouse dynamics", IEEE Transactions on Dependable and Secure Computing, Jul.-Sep. 2007, vol. 4, Issue 3, 165-179 (15 pages), IEEE Computer Society, USA.

Cheng Bo et al., "Continuous User Identification via Touch and Movement Behavioral Biometrics", 2014, 8 pages, IEEE, USA.

Tobias Braun, "User authentication from acceleration censor data", Bachelor's Thesis, Oct. 28, 2014, 62 pages.

Richard Chow et al., "Authentication in the clouds: A framework and its application to mobile users", Oct. 8, 2010, 6 pages, Chicago, Illinois, USA.

N.L Clarke et al., "Advanced user authentication for mobile devices,computers & security", Aug. 22, 2006, 109-119 (11 pages), vol. 26, Elsevier, USA.

Mauro Conti et al., "Mind how you answer me! (Transparently authenticating the user of a smart phone when answering or placing a call)", IEEE Conference on Computer Vision and Pattern Recognition Workshops, Mar. 22-24, 2011, 249-260 (12 pages), Hong Kong, China.

D. Damopoulos et al., "From key loggers to touchloggers: Take the rough with the smooth", Computers and Security, Oct. 15, 2012, 102-114 (13 pages), vol. 32, Elsevier, Greece.

Alexander De Luca et al., "Touch me once and I know it's you! Implicit authentication based on touch screen patterns", May 5-10, 2012, 10 pages, Austin, Texas, USA.

Mohammed O. Derawi et al., "Unobtrusive user-authentication on mobile phones using biometric gait recognition", 2010, 6 pages.

Ben Draffin et al., "KeySens: Passive user authentication through micro-behavior modeling of soft keyboard interaction", 2014, 18 pages.

(56) References Cited

OTHER PUBLICATIONS

Tao Feng et al., "Continous mobile authentication using touchscreen gestures", 2012, 6 pages.
Mario Frank et al., "Touchalytics: On the applicability of touch screen input as a behavioral biometric for continuous authentication", Oct. 10, 2012, 20 pages.
Anthony J. Grenga, "Android based behavioral biometric authentication via multi-modal fusion", Thesis, Jun. 2014, 62 pages, Air Force Institute of Technology, Wright-Patterson Air Force Base, Ohio, USA.
Markus Jakobsson et al., "Implicit authentication for mobile devices", 2009, 6 pages.
Michael Karlesky et al., "Who you are by way of what you are: Behavioral biometric approaches to authentication", Symposium on Usable Privacy and Security (SOUPS), Jul. 9-11, 2014, 2 pages, Menlo Park, California, USA.
Jennifer R Kwapisz et al., "Cell phone- Based biometric identification", 2010, 7 pages.
Lingjun Li et al., "Unobservable Re-authentication for smartphones", 2013, 16 pages.
Yuxin Meng et al., "Touch gestures based biometric authentication scheme for touchscreen mobile phones", 2013, 20 pages.
Abena Primo et al., "Context-Aware active authentication using smartphone accelerometer measurements", IEEE Conference on Computer Vision and Pattern Recognition Workshops, 2014, 8 pages.
Oriana Riva et al., "Progressive authentication: Deciding when to authenticate on mobile phones", 2012, 16 pages.
Nashad Ahmed Safa et al., "Privacy—Preserving implicit authentication", 2014, 22 pages.
Abdul Serwadda et al., "When kids' toys breach mobile phone security", Nov. 4-8, 2013, 12 pages.
Abdul Serwadda et al., "Which Verifiers work? : A Benchmark evaluation of touch-based authentication algorithms", 2013, 8 pages.
Elaine Shi et al., "Implicit authentication through learning user behavior", 2011, 99-113 (15 pages), vol. 6531, Springer Berlin Heidelberg, Germany.
Weidong Shi et al., "SenGuard: Passive user identification on smartphones using multiple sensors", IEEE 7th International Conference on Wireless and Mobile Computing, Networking and Communications (WiMob), 2011, 8 pages, USA.
Zdenka Sitova et al., "HMOG: A new biometric modality for continuous authentication of smart phone users", Jan. 5, 2015, 14 pages.
Hui Xu et al., "Towards continuous and passive authentication via touch biometrics: An experimental study on smartphones", Tenth Symposium on Usable Privacy and Security, Jul. 9-11, 2014, 187-198 (12 pages), Meldo Park, California, USA.
Nan Zheng et al., "You are how you touch: User verification on smartphones via tapping behaviors", Technical Report, Dec. 6, 2012,13 pages.
Ahmed Awad E. Ahmed et al., "Anomaly Intrusion Detection based on Biometrics", Proceedings of the 2005 IEEE Workshop on Information Assurance and Security, 2005, 452-453 (2 Pages), United States Military Academy, West Point, New York, USA.
Adam J. Aviv et al., "Smudge Attacks on Smartphone Touch Screens", Paper, 2010, 10 Pages, USENIX, Last retrieved from https:/lwww.usenix.org/legacy/eventlwoot10/tech/fulLpapers/Aviv.pdf.
Adam J. Aviv et al., "Practicality of Accelerometer Side Channels on Smartphones", Dec. 3-7, 2012, 10 Pages.
Abhijit Bose et al., "Behavioral Detection of Malware on Mobile Handsets", Jun. 17-20, 2008, 14 Pages, MobiSys'08, Breckenridge, Colorado, USA.
Liang Cai et al., "TouchLogger: Inferring Keystrokes on Touch Screen From Smartphone Motion", 2011, 6 Pages.
Aaron Carroll et al., "An Analysis of Power Consumption in a Smartphone", 2010, 14 Pages.
Stephen Dernbach et al., "Simple and Complex Activity Recognition Through Smart Phones", Jun. 26-29, 2012, 8 Pages.
Mian Dong et al., "Self-Constructive High-Rate System Energy Modeling for Battery-Powered Mobile Systems", Jun. 28-Jul. 1, 2011, 14 Pages, Bethesda, Maryland, USA.
Denzil Ferreira at al., "Understanding Human-Smartphone Concerns: A Study of Battery Life", 2011, 19-33 (15 Pages), Springer, Berlin, Heidelberg, Germany.
O. Durmaz Incel et al., "A Review and Taxonomy of Activity Recognition on Mobile Phones, Journal of Bionanoscience", Jun. 2013, 43 Pages.
Amy K. Karlson et al., "Can I Borrow Your Phone? Understanding Concerns When Sharing Mobile Phones", Apr. 4-9, 2009, 4 Pages, Boston, USA.
Hahnsang Kim et al., "Detecting Energy-Greedy Anomalies and Mobile Malware Variants", Jun. 17-20, 2008, (14 Pages), Breckenridge, Colorado, USA.
Eunju Kim et al., "Human Activity Recognition and Pattern Discovery", Dec. 31, 2009,10 Pages.
Yang Li et al., "An active learning based TCM-KNN algorithm for supervised network intrusion detection, Computers & Security", Oct. 10, 2007, 459-467 (9 Pages), vol. 26, Elsevier.
Lei Liu et al., "VirusMeter: Preventing Your Cell phone from Spies", 2009, 244-264 (21 Pages), Springer, Berlin, Heidelberg, Germany.
John C. McCullough et al., "Evaluating the Effectiveness of Model-Based Power Characterization", 2011, 14 Pages.
Emiliano Milluzo et al., "TapPrints: Your Finger Taps Have Fingerprints", Jun. 25-29, 2012, 14 Pages, Low Wood Bay, Lake District, UK.
Rahul Murmuria et al., "Mobile Application and Device Power Usage Measurements", IEEE Sixth International Conference on Software Security and Reliability, 2012, 147-156 (10 Pages), IEEE Computer Society Washington, DC, USA.
Ildar Muslukhov et al., "Know Your Enemy: The Risk of Unauthorized Access in Smartphones by Insiders", 2013, 10 Pages.
Abhinav Pathak et al., "Fine-Grained Power Modeling for Smartphones Using System Call Tracing", Apr. 10-13, 2011, 15 Pages, Salzburg, Austria.
Stephen J. Preece et al., "A Comparison of Feature Extraction Methods for the Classification of Dynamic Activities From Accelerometer Data", IEEE Transactions on Biomedical Engineering, Mar. 2009, 871-879 (9 Pages), vol. 56, Issue 3, IEEE.
Stephen J. Preece et al., "Activity identification using body-mounted sensors—a review of classification techniques", Physiological Measurement, Apr. 2, 2009, 34 Pages, Institute of Physics and Engineering in Medicine, UK.
Malek Ben Salem et al., "Decoy Applications for Continuous Authentication on Mobile Devices, Symposium on Usable Privacy and Security (SOUPS)", Jul. 9-11, 2014, 2 Pages, Menlo Park, California, USA.
Muhammad Shoaib et al., "Fusion of Smartphone Motion Sensors for Physical Activity Recognition", Sensors, Jun. 10, 2014, 10146-10176 (32 Pages), vol. 14, Basel, Switzerland.
Alex Shye et al., "Into the Wild: Studying Real User Activity Patterns to Guide Power Optimizations for Mobile Architectures", Dec. 12-16, 2009, 11 Pages, USA.
Qiang Xu et al., "Identifying Diverse Usage Behaviors of Smartphone Apps", Nov. 2-4, 2011, 13 Pages, Berlin, Germany.
Zhi Xu et al., "Tap Logger: Inferring User Inputs on Smart phone Touch screens Using On-board Motion Sensors", Apr. 16-18, 2012, 12 Pages, Tucson, Arizona, USA.
Roman V. Yampolskiy et al., "Behavioural biometrics: a survey and classification", Int. J. Biometrics, 2008, 81-113 (33 Pages), vol. 1, Issue 1, Inderscience Publishers, Geneva, Switzerland.
Lide Zhang et al., "Accurate Online Power Estimation and Automatic Battery Behavior Based Power Model Generation for Smartphones", Oct. 24-29, 2010, 10 Pages, Scottsdale, Arizona, USA.
Eamonn Keogh, et al., "HOT SAX: Efficiently Finding the Most Unusual Time Series Subsequence", Proceedings of the Fifth IEEE International Conference on Data Mining (ICDM'05), 8 pages, 2005.

\* cited by examiner

FIG. 7

| Feature | Device | Min | Taps Q1 | Median | Q2 | Max | Range | IQR |
|---|---|---|---|---|---|---|---|---|
| last_start | Nexus 5 | 110 | 927 | 2632 | 7044 | 30000 | 29890 | 6117 |
| | Galaxy S6 | 253 | 1028 | 1764 | 3823 | 25266 | 25013 | 2795 |
| duration | Nexus 5 | 0 | 0 | 34 | 58 | 124 | 124 | 58 |
| | Galaxy S6 | 22 | 67 | 80 | 93 | 138 | 116 | 26 |
| direction | Nexus 5 | -169 | -45 | 0 | 0 | 180 | 349 | 45 |
| | Galaxy S6 | -157 | -76 | 72 | 102 | 180 | 337 | 178 |
| avg_diameter | Nexus 5 | 3 | 4 | 4.4 | 5 | 6 | 3 | 1 |
| | Galaxy S6 | 3 | 4 | 4.8 | 5.8 | 7.6 | 4.6 | 1.8 |
| avg_pressure | Nexus 5 | 13 | 44 | 46 | 48 | 54 | 41 | 4 |
| | Galaxy S6 | 2 | 13 | 16 | 32 | 41 | 39 | 19 |

FIG. 14a

| Feature | Device | Swipes | | | | | | |
|---|---|---|---|---|---|---|---|---|
| | | Min | Q1 | Median | Q2 | Max | Range | IQR |
| last_start | Nexus 5 | 0 | 1072.5 | 2845 | 7672 | 27545 | 27545 | 6599.5 |
| | Galaxy S6 | 854 | 6519 | 18322 | 25660 | 27234 | 26380 | 19150 |
| duration | Nexus 5 | 42 | 202 | 401 | 727 | 9904 | 9862 | 525 |
| | Galaxy S6 | 206 | 443 | 624 | 1027 | 5938 | 5732 | 584 |
| arc_length | Nexus 5 | 70 | 416 | 524 | 672 | 1809 | 1739 | 256 |
| | Galaxy S6 | 476 | 983 | 1295 | 1637 | 3152 | 2676 | 654 |
| direction | Nexus 5 | -180 | -99 | -17 | 103 | 180 | 360 | 202 |
| | Galaxy S6 | -179 | -155 | -148 | -137 | 179 | 358 | 18 |
| avg_diameter | Nexus 5 | 3 | 4.5 | 5 | 5.4 | 8.5 | 5.5 | 0.9 |
| | Galaxy S6 | 5.3 | 8.2 | 8.8 | 9.5 | 11.5 | 6.2 | 1.3 |
| avg_pressure | Nexus 5 | 43 | 48 | 51 | 54 | 76 | 33 | 6 |
| | Galaxy S6 | 22 | 50 | 59 | 69 | 105 | 83 | 19 |
| avg_speed | Nexus 5 | 0.13 | 0.72 | 1.44 | 2.58 | 10.19 | 10.06 | 1.86 |
| | Galaxy S6 | 0.36 | 1.18 | 1.84 | 2.91 | 7.12 | 6.76 | 1.73 |

FIG. 14b

ACTIVE AUTHENTICATION OF USERS

PRIORITY CLAIM

This application is based on and derives the benefit of U.S. Provisional Application 62/204,056, filed on Aug. 12, 2015, and U.S. Non Provisional application Ser. No. 15/236,049, filed on Aug. 12, 2016, the contents of which are incorporated herein by reference.

This invention was made with government support under Contract Number D15PC00178 awarded by the Department of Homeland Security, Science and Technology Directorate; and Contract Number FA8750-15-C-0056 awarded by the Defense Advanced Research Projects Agency. The government has certain rights in the invention.

TECHNICAL FIELD

The present disclosure relates to electronic devices, and, more particularly, to authenticating users of electronic devices.

SUMMARY

In an example embodiment, a computer-implemented method for continuous authentication of users of an electronic device includes collecting data from an actual user of an electronic device including touch measurements, measurements from an accelerometer, measurements from a gyroscope, application context, and power measurements of the electronic device by an authentication engine; checking for a deviation of the collected data by the authentication engine from a behavior model of the user; and enforcing at least one access control policy on the electronic device by an enforcement engine based on an input from the authentication engine, on the authentication engine detecting deviations equal to or greater than a pre-defined number of deviations within a pre-defined time window.

Embodiments herein disclose a computer-implemented method of building a behavior model. The method includes collating information about a user by an authentication engine; extracting features from the collated information by the authentication engine using a feature selection technique; selecting a subset of features from the extracted features by dropping quartiles by the authentication engine; assigning individual weights for the selected subset of features by the authentication engine; standardizing the extracted features by the authentication engine; and generating the baseline by the authentication engine using the standardized features.

Embodiments herein disclose an apparatus operable to authenticate users of an electronic device. The apparatus comprises a processor; and a memory device, operatively connected to the processor, and having stored thereon instructions that, when executed by the processor, cause the processor to collect data from an actual user of the apparatus including touch measurements, measurements from an accelerometer, measurements from a gyroscope, application context, and power measurements of the apparatus; check for a deviation of the collected data from a behavior model of the user; and enforce at least one access control policy on the electronic device based on an input, on detecting deviations equal to or greater than a pre-defined number of deviations within a pre-defined time window.

Embodiments herein disclose an apparatus operable to build a behavior model. The apparatus comprising a processor; and a memory device, operatively connected to the processor, and having stored thereon instructions that, when executed by the processor, cause the processor to collate information about a user; extract features from the collated information using a feature selection technique; select a subset of features from the extracted features by dropping quartiles; assign individual weights for the selected subset of features; standardize the extracted features; and generate the baseline using the standardized features.

Embodiments herein disclose a system for authenticating users of an electronic device including a sensor manager including circuitry configured to receive data from at least one of a gyroscope capture module, a power monitoring module, and a touch events capture module; an authentication engine including circuitry configured to collect data from an actual user of the apparatus including touch measurements, measurements from an accelerometer, measurements from a gyroscope, application context, and power measurements of the apparatus; and check for a deviation of the collected data from a behavior model of the user; and an enforcement module including circuitry configured to enforce at least one access control policy on the electronic device based on an input from the authentication engine, on detecting deviations equal to or greater than a pre-defined number of deviations within a pre-defined time window.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE FIGURES

The embodiments herein will be better understood from the following detailed description with reference to the drawings, in which:

FIG. 7 depicts an algorithm for using p-values to calculate anomalies and probability of stress, according to example embodiments as disclosed herein;

FIGS. 14*a* and 14*b* depict the boundaries are depicted for the 5 quartile readings for each feature on each device, according to example embodiments as disclosed herein.

DETAILED DESCRIPTION OF EMBODIMENTS

Figure 1:
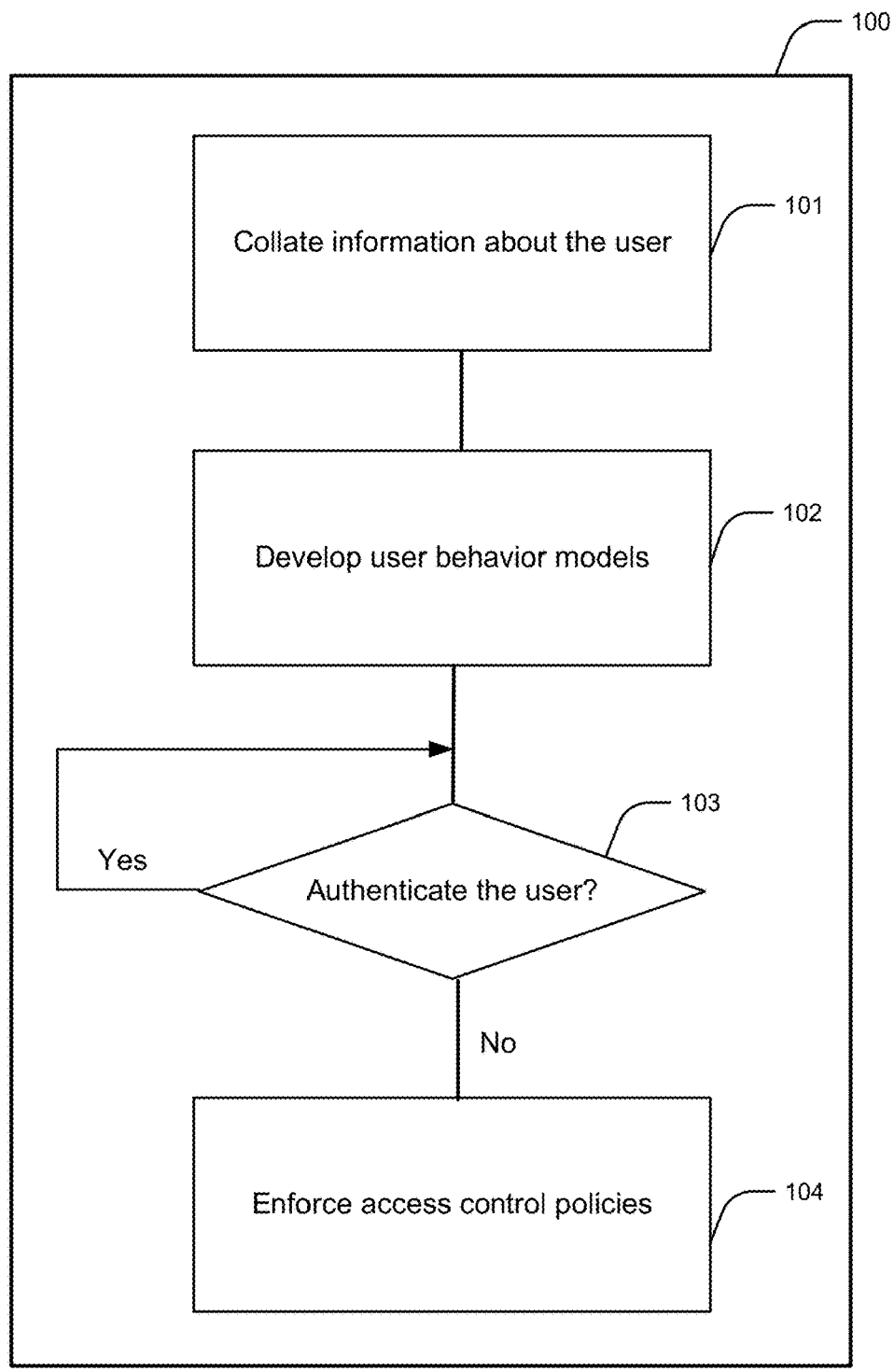
FIG. 1 is a flowchart depicting an exemplary method of building user models and performing authentication using the user models, according to example embodiments as disclosed herein.

The example embodiments herein and the various features thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description used herein is intended merely to facilitate an understanding of ways in which the example embodiments herein may be practiced and to further enable those of skill in the art to practice the embodiments herein. Accordingly, this disclosure should not be construed to be limited in scope of by the example embodiment disclosed.

This disclosure describes methods and systems for actively authenticating users of an electronic device in a continuous manner using a plurality of factors comprising of power consumption, application usage, user interactions, and user movement. The disclosure includes building models for normal usage of the electronic device for each user. Based on the models, the disclosed systems and methods determine variations in the factors by checking for outliers with respect to a baseline distribution of user data. In the present disclosure, an outlier is a value that falls outside of a pre-defined configurable (may be configurable per user) bound. On detecting outliers the disclosed systems and methods can apply at least one policy on the electronic device and potentially request the user to go through the authentication process again.

An electronic device as used herein can refer to a mobile phone, a smart phone, a tablet, a wearable computing device, a computer, a laptop, a convertible computing device (for example, which can serve as a laptop and a tablet), and any other such device that includes mechanisms to authenticate its user.

Embodiments herein disclose a continuous authentication system that uses individualized parameters in a manner that is scalable and can perform all the operations in the end device without the need for communicating to a back-end server. Embodiments herein are based on the pre-calculation of common data that are then being used to seed the generation of individualized parameters and user profiles. Embodiments herein disclose device portability by transferring the system functionality and mapping the profiles generated on one device to other devices.

Embodiments herein disclose techniques that effectively separate legitimate users of devices from imposters, to protect the users from device theft or misuse that can result in malicious and harmful activities being performed on their behalf using data and applications from on their devices and online accounts. To that end, embodiments herein perform continuous authentication by using a combination of touch, movement, and power patterns that can be considered to be unique to a legitimate user and flag deviations from those patterns. As those deviations are discovered, penalties are applied that curtail the functionalities available on the device to the imposter, culminating on restrictions on most of the main functions of the device. The restrictions can be implemented through dynamic policy enforcement that takes into consideration the user authentication level (also referred to as authentication score). Embodiments herein disclose a decision engine that fuses data received from biometric modalities enhanced with the process of producing the weights that lead to the calculation of the authentication score.

To generate the authentication score, embodiments herein follow an unsupervised approach that does not require learning of the abnormal (imposter) behavior. Embodiments herein compare the behavior currently being observed to a baseline of legitimate observations and, in a principled, statistically-based manner, decide whether they fit the normal patterns of behavior or not.

Furthermore, all extracted features are weight based on training measurements and data obtained from each individual user. This boosts the performance of the overall authentication system as a whole by leveraging features that separate each user from the rest. This results in machine learning parameters and ensemble weights that are tightly customized to the specific user in a way that optimizes accuracy within statistical error bounds. Thus, the continuous assessment of the authentication score is coupled very tightly to the user's bio-metric modalities and features not only by the modalities themselves but also by the way those modalities are configured and combined together to produce the authentication score. Moreover, embodiments herein heavily rely on the use of the application "context" to identify biometric behavior within an application as opposed to the device or across all applications.

One of the challenges faced by one of skill in the art when it comes to the practical deployment of individualized features and parameters, is being able to scale the computation during training and data processing to run fully in the mobile device optimally for large numbers of users. Embodiments herein address the scaling of individualized parameters issue by leveraging novel optimization and parallel computation techniques that will be applied to different stages of the pre-processing and post-processing of data. In addition, embodiments herein address the problem not only for a fixed set of users but rather one that changes both in terms of user growth and in terms of user "drifts" (i.e. changes in the legitimate behavioral models that occur over a large period of time). As part of this effort, embodiments herein extract common and uncommon baselines across all user data and extract a minimum set that can be retrofitted to a resource constrained mobile device to produce individualized parameters. To detect unauthorized access, embodiments herein rely on a multitude of user-tailored models to provide evidence of deviation from the generated user envelope. The decision support process institutes a series of "tests" that require that no more than n readings within consecutive window of events before the user is locked out from the application or device and is prompted to re-authenticate. This threshold can be adjusted to obtain the desired False Reject Rate (FRR) and False Acceptance Rate (FAR).

FIG. 1 is a flowchart 100 depicting an exemplary method of building user models and performing authentication using the user models. At step 101, the electronic device collates information about the user, such as, for example, biometric data, touch related actions, movements, application usage, and power consumption patterns. The electronic device can collate information about the user from application sensors and/or kernel sensors present in the electronic device. The electronic device can collect information from the input driver, provided the requisite permissions are provided. At step 102, the electronic device uses the collated information to build user behavior models. The electronic device can use algorithms that are capable of detecting outliers with respect to the baseline distribution and placing a bound on how many outliers can be permitted. Exceeding this bound is an indication of the user being an impostor. In an example embodiment, a first technique utilized for multivariate data (for example, the data collected from touch and movement modalities), is an adaptation of a Strangeness-based Outlier Detection algorithm (StrOUD). The second technique utilized for univariate time-series data (for example, power measurements) is based on a discord algorithm. The user behavior models can comprise of the manner in which the user interacts with the electronic device, in terms of, for example, the touch patterns of the user, movements, power consumption patterns, and application usage under so called "normal" conditions with an bound set for allowable anomalous behavior. The use of the term normal conditions in the context of the present disclosure means circumstances when its rightful user is using a device. This includes, for example, an owner of the device, or a user allowed to the use the device by the owner such as, for example, a friend or a colleague. The user behavior models can also comprise of biometric information related to the user.

At step 103, the electronic device authenticates the user in a continuous manner, by checking for deviations from the modeled behavior that fall outside of the bounds set for allowable anomalous behavior. This authentication can be performed by the user device by monitoring parameters including, for example, measurements from the touch sensors present in the device, measurements from the accelerometer, measurements from the gyroscope, and power measurements (which can be the amount and rate of power consumption by the device and/or applications resident on the device). The electronic device can check for a pre-defined number of deviations within a pre-defined time window. On detecting deviations (which can be equal to or greater than the pre-defined number of deviations with the pre-defined time window), at step 104, the electronic device enforces at least one access control policy, wherein one or more resources/applications on the electronic device are blocked or the entire electronic device is locked, till the user authenticates himself/herself again. The various actions in method 100 may be performed in the order presented, in a different order or simultaneously. Furthermore, in some embodiments, some actions listed in FIG. 1 may be omitted.

Figure 2:
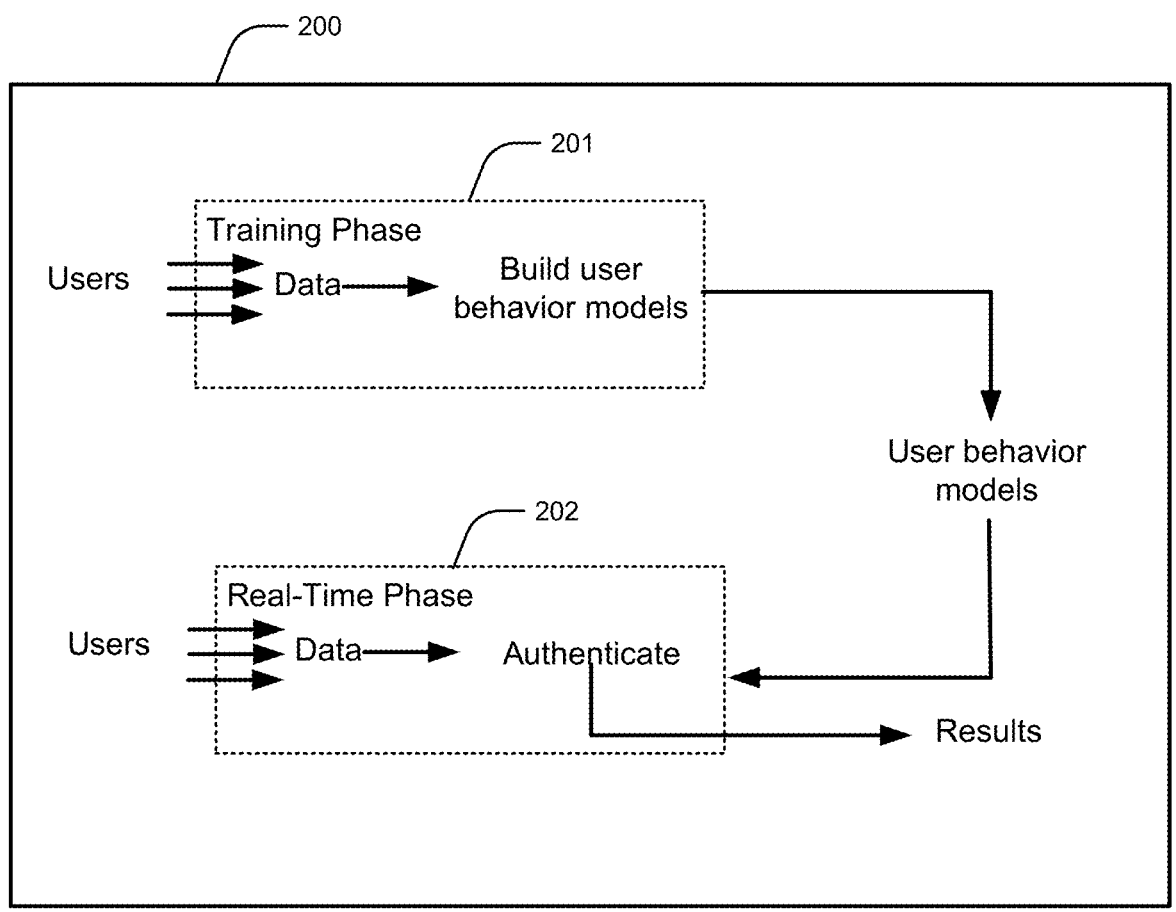
FIG. 2 depicts a process of building user behavior models and authenticating the users based on the user behavior models, according to example embodiments as disclosed herein.

FIG. 2 depicts a process 200 of building user behavior models and authenticating the users based on the user behavior models according to an example embodiment of the present disclosure. During the training phase 201, the electronic device collates information about the user such as, for example, biometric data, touch related actions, movements, and power consumption patterns. The information can comprise of information based on the user interacting with the electronic device, and applications present in the electronic device. Types of information captured includes summary statistics such as central tendency, statistical dispersion, skewness, and five-number summary of the time domain features, descriptive statistics such as cross-correlation of the time domain features, and mathematical transforms of the frequency domain features. An example list of information captured is as follows:

last_start: Time since start of previous gesture
duration: Duration of the current gesture from touch down to touch up
ends_dist: Straight-line distance between the first and last coordinates of the gesture
arc_length: Actual length of the gesture
deviation: Difference between arc_length and ends_dist
ends_direction: Angle between the first and last coordinates in the gesture
avg_diameter: Average of finger diameter in contact
sd_diameter: Standard deviation of the finger contact
$q_0,q_1,q_2,q_3,q_4$: The 5-quartiles for the sequence of diameter readings
range_diameter: q4_diameter-q0_diameter
iqr_diameter: q3_diameter-q1_diameter
skew_diameter: avg_diameter-q2_diameter
avg_pressure: Average of finger pressure in contact
sd_pressure: Standard deviation of the finger contact
$q_0,q_1,q_2,q_3,q_4$: The 5-quartiles for the sequence of pressure readings
range_pressure: q4_pressure-q0_pressure
iqr_pressure: q3_pressure-q1_pressure
skew_pressure: avg_pressure-q2_pressure
avg_speed: Average of speed of the finger in contact
sd_speed: Standard deviation of the finger contact
$q_0,q_1,q_2,q_3,q_4$: The 5-quartiles for the sequence of speed readings
range_speed: q4_speed-q0_speed
iqr_speed: q3_speed-q1_speed
skew_speed: avg_speed-q2_speed
avg_acceleration: Average of acceleration of the finger in contact
sd_acceleration: Standard deviation of the finger contact
$q_0,q_1,q_2,q_3,q_4$: The 5-quartiles for the sequence of acceleration readings
range_acceleration: q4_acceleration-q0_acceleration
iqr acceleration: q3_acceleration-q1_acceleration
skew_acceleration: avg_acceleration-q2_acceleration
avg_accel_x: Average of accelerometer readings on x-axis
avg_accel_y: Average of accelerometer readings on y-axis
avg_accel_z: Average of accelerometer readings on z-axis
std_accel_x: Standard deviation of accelerometer readings on x-axis
std_accel_y: Standard deviation of accelerometer readings on y-axis
std_accel_z: Standard deviation of accelerometer readings on z-axis
mag_accel: Average resultant of the x,y,z readings
fft_accel_x: Magnitude of first 5 coefficients of the power spectrum of Fourier transform along accelerometer's x-axis
fft_accel_y: Magnitude of first 5 coefficients of the power spectrum of Fourier transform along accelerometer's y-axis
fft_accel_z: Magnitude of first 5 coefficients of the power spectrum of Fourier transform along accelerometer's z-axis
fft_accel_r: Magnitude of first 5 coefficients of the power spectrum of Fourier transform for accelerometer's average resultant
avg_gyro_x: Average of gyroscope readings on x-axis
avg_gyro_y: Average of gyroscope readings on y-axis avg_gyro_z: Average of gyroscope readings on z-axis
std_gyro_x: Standard deviation of gyroscope readings on x-axis
std_gyro_y: Standard deviation of gyroscope readings on y-axis
std_gyro_z: Standard deviation of gyroscope readings on z-axis
mag_gyro: Average resultant of the x,y,z readings
fft_gyro_x: Magnitude of first 5 coefficients of the power spectrum of Fourier transform along gyroscope's x-axis
fft_gyro_y: Magnitude of first 5 coefficients of the power spectrum of Fourier transform along gyroscope's y-axis
fft_gyro_z: Magnitude of first 5 coefficients of the power spectrum of Fourier transform along gyroscope's z-axis
fft_gyro_r: Magnitude of first 5 coefficients of the power spectrum of Fourier transform for gyroscope's average resultant After collecting the raw data, features are extracted. However, as the number of dimensions/features increase, the concept of nearest neighbor becomes meaningless because all the vectors are far away from each other. Moreover, finding neighbors becomes increasingly inefficient. This phenomenon is known as the 'curse of dimensionality. For that reason, it is advisable to reduce the space to a manageable number of attributes. Hence, a feature selection technique is required.

For touch modality, a feature selection technique is used that selects all subsets of the full list of features and evaluates them for performance against the previously collected dataset of users. As an example, consider a representative application—WhatsApp. In the dataset of the user, this app had the most data, with most users having over 1000 swipes and 1000 taps.

In order to select the best feature set, a subset of features are selected by dropping the quartiles (5 each for diameter, pressure, speed, and acceleration). The rationale for this decision is that these quartiles were already indirectly measured by other features, namely, Range, Inter-Quartile Range, and Skew. A brute force search is run on feature sets with a length of 1 to 5 features. This produced 83681 combinations and each one of them is processed for taps and swipes separately.

Embodiments herein create a common baseline in advance. This needs to be generated only once for a selected feature set and a common baseline is configured on every device initially. The common baseline data enables scaling, avoidance of computationally expensive calculation on the end device and circumventing the use of a server to find the optimal individual values and weights.

Further, the feature extraction step happens on the electronic device during data collection in real-time. This reduces redundancy and the raw data is converted to gestures while only the most recent measurements are in memory. The memory of the electronic device is flushed as soon as each gesture is saved into the baseline file stored on the electronic device. For development stages, both the raw data and the feature extracted gesture data are extracted into files. However, when deployed in production, raw data need not be collected. This will reduce I/O and memory requirements.

Further, individualized weights are assigned for each user. In an embodiment herein, a subset of the available sensor features can be used, as one or more of the features may be correlated. The features are used to represent characteristics of the user, which describe the behavior of the user and, at the same time, are separating the user from other users. For example, the lengths (in pixels) of each touch gesture, the average pressure applied on screen during this gesture, and the time since last gesture of the user. For Touch modality, one gesture begins when the user touches the screen (finger down), and ends when the user releases the screen (finger up). For movement modality, the sensors have a continuous stream of measurements; therefore, a window of 2 seconds has been used to represent a movement gesture. Further, a sliding window of 1 second has been used, such that every individual event contributes to two consecutive windows.

Once the feature extraction is completed, each row represents one touch gesture, or one window of movement. This data needs to be standardized, in order to bring all the columns to the same range of values. This is achieved by computing the mean and standard deviation of each attribute/feature, subtracting the mean from each value and dividing it by the standard deviation. This makes the data range between the values −1 and +1.

The electronic device uses the collated information to build the user behavior models. The electronic device generates baselines from the data collected from each user. In addition, the electronic device generates a single common set of readings from all the users that have been previously recorded. This is done to reward a user for matching his baseline only if the gestures performed by the user is not common to all or most users.

The electronic device can use techniques that are capable of detecting outliers with respect to the baseline distribution and placing a bound on how many outliers can be permitted. Exceeding this bound is an indication of the user being an impostor. In an example embodiment, a first technique utilized for multivariate data (for example, the data collected from touch and movement modalities), is an adaptation of a Strangeness-based Outlier Detection algorithm (StrOUD). Another technique that can be utilized for univariate time-series data (for example, power measurements) is based on a discord algorithm. While the example embodiments discuss the use adaptations of the StrOUD and discord algorithm, one of skill in the art will appreciate that other techniques may be used for detecting outliers without departing from the scope of the disclosure.

For touch and movement modality, the electronic device uses the StrOUD algorithm to detect anomalies. A new gesture is considered an anomaly if the strangeness value of the gesture when evaluated against the baseline of the user is greater than a threshold and it does not fit into the baseline. The electronic device applies a penalty algorithm in order to penalize the user for anomalies. If the anomalies are clustered together, the user is penalized exponentially. If the new gesture is found to fit well into the baseline, then it is also compared with the common data and another strangeness score is calculated. If the strangeness against the common data is less than the strangeness against the user's baseline, the new gesture is considered a common event and the authentication score is not changed. Otherwise, the user is rewarded linearly for every good gesture.

The electronic device can use optimization methods for reducing the execution of the nearest neighbors step for every new gesture, such as KD-Tree, Ball-tree. The electronic device can store anomalies with a bit array. Embodiments herein optimize the comparison with common data. When each test dataset was compared with the common dataset on the server, a list of accepts that were to be discounted from the scoring were discovered. Removing these from the long bit array required running a loop and shifting all the elements in memory, which was time consuming. When comparing to the common data, another series of 0 s and 1 s based on the test data matching the common baseline or not were obtained. Embodiments herein invert this sequence such that the gestures that were to be discounted were now 1s and use indexing to remove all the common elements and create a new copy of the entire bitarray at once, thereby reducing the number of writes significantly.

The user behavior models can comprise of the manner in which the user interacts with the electronic device, in terms of, for example, the touch patterns of the user, movements, power consumption patterns, and application usage under so called "normal" conditions with an bound set for allowable anomalous behavior. The use of the term normal conditions in the context of the present disclosure means conditions where a device is being used by its rightful user (for example, the owner or a user allowed to the use the device by the owner such as, for example, a friend or a colleague). The user behavior models can also comprise of biometric information related to the user.

In the real-time phase 202, the electronic device authenticates the user in a continuous manner, by checking for deviations between the modeled usage behavior of the user and actual use of the electronic device. The electronic device can check for a pre-defined number of deviations within a pre-defined time window. On detecting deviations (which can be equal to or greater than the pre-defined number of deviations with the pre-defined time window), the electronic device can enforce access control policies, wherein one or more resources/applications (such as the camera, microphone, communication mechanisms (such as, for example, Bluetooth, Near Field Communications (NFC), file system, address book, messages, and emails) on the electronic device are blocked or the electronic device is locked until the user is authenticated.

Figure 3:
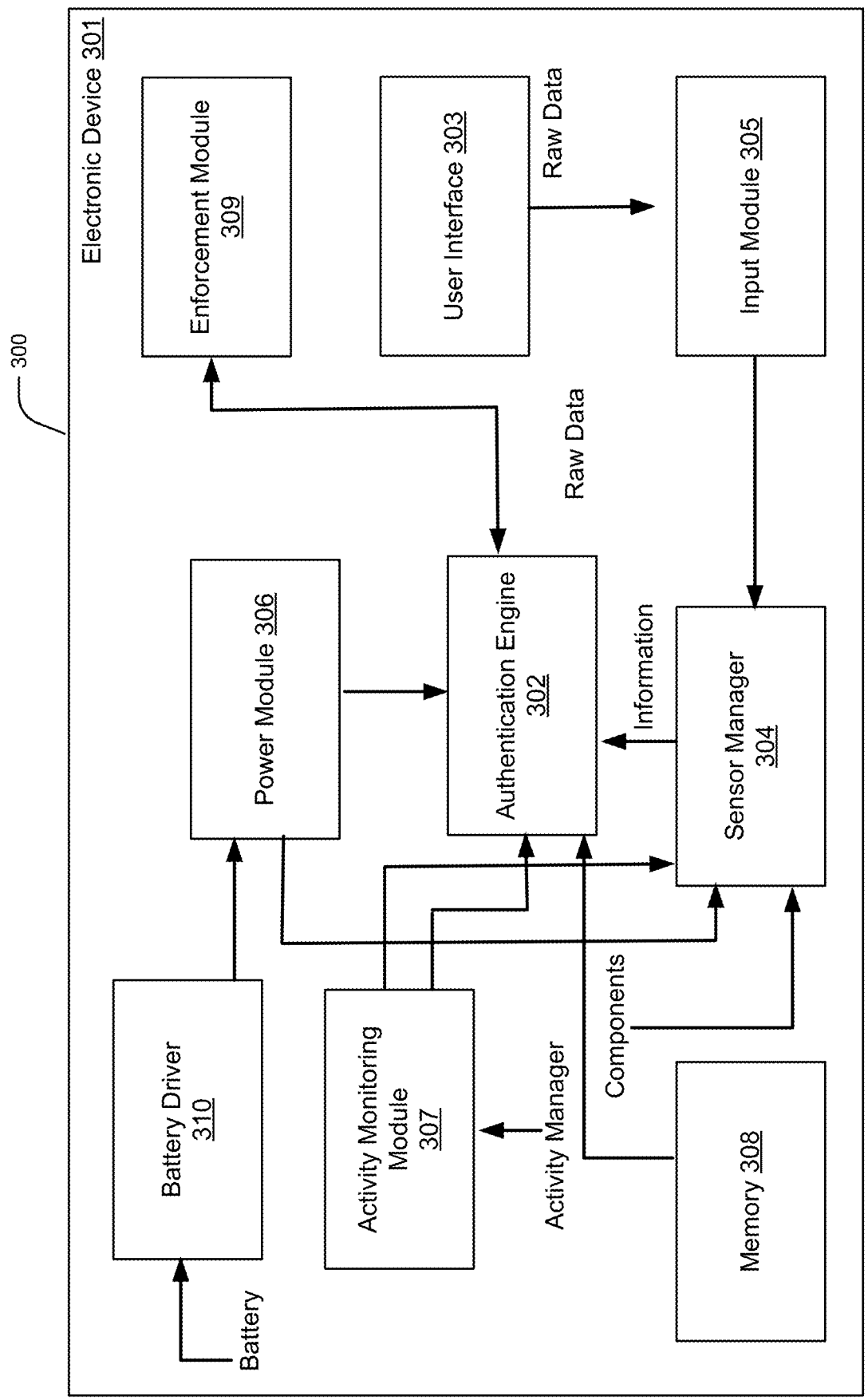
FIG. 3 depicts modules of an electronic device, that provide data to the authentication engine, according to example embodiments as disclosed herein.

FIG. 3 depicts the modules of electronic device 300, wherein these modules provide data to the authentication engine. The electronic device 301, as depicted comprises of an authentication engine 302, at least one user interface ("UI") 303, a sensor manager 304, an input module 305, a power module 306, an activity monitoring module 307, a memory 308, an enforcement engine 309, and a battery driver 310. The user interface 303 includes a mechanism for a user to interact with the electronic device 301. The user interface 303 can comprise of at least one of a display, a touchscreen, a physical keyboard, at least one physical button, a soft keyboard, or any other mechanism that can be used to convey commands from a user to electronic device 301.

The authentication engine 302 can collect datapoints related to the electronic device 301, such as voltage, current, battery charge, processor usage, processor frequency, display brightness, uplink/downlink bytes (using a suitable communication mode such as Wi-Fi, Bluetooth, or any other suitable communication mode), memory, audio state, GPS state, and any other suitable data point. The authentication engine 302 can collect system-wide touchscreen events in the form of raw data. The authentication engine 302 can also collect gyroscope data. Furthermore, the authentication engine 302 can record user activity on the device 301. It also generates an authentication score that can be input to the enforcement engine.

In an example embodiment herein, the authentication engine 302 can be located external to the electronic device 301 and connected to the electronic device via a wired network, a cellular network, or a wireless network (for example, a Local Area Network (LAN), Wi-Fi, or any communication mechanism that allows the electronic device 301 to exchange data with an external entity). On the other hand, the authentication engine 302 may be part of the electronic device 301, that is, it may be part of the same chassis. In an example embodiment, authentication engine 302 may be a programmable software routine running on an operating systems such as, for example, iOS, Android, Windows, Linux, Unix, or any other operating system operable on electronic device 301. The software routine may be programmable using languages such as C, C++, JAVA, and Android API. The authentication 302 software routine may run on hardware module that includes a Central Processing Unit ("CPU") and one or more memory units such as, for example, Random Access Memory ("RAM"), Read Only Memory ("ROM"), and Dynamic Random Access Memory ("DRAM"). In another example embodiment, authentication engine 302 may be implemented solely in hardware using Application Specific Integrated Circuits ("ASCIs"), Field Programmable Gate Arrays ("FPGAs") and other such specific hardware components. In yet another example embodiment, authentication engine 302 may be implemented as a combination of hardware and software, with its functionality distributed between hardware and software.

The sensor manager 304 can receive information from sensors present in the electronic device 301, such as an accelerometer, a gyroscope, ON/OFF status of the UI 303, and any other related information. The sensor manager 304 can poll the at least one of the sensors in a continuous manner. At least one sensor can send information to sensor manager 304, on an event occurring (such as the accelerometer detecting movement of the electronic device 301, the display turning ON, or any other event). The sensor manager 304 can poll the sensors, based on the current state of the electronic device 301. In an example, if the battery of the device 301 is below a pre-defined percentage, the sensor manager 304 can poll the sensors at less frequent intervals. If the sensors provide information to the kernel, the sensor manager 304 can use a suitable low-level file system parsing technique such as a top-down method or a bottom-up method (for example, a Backtracking recursive descent method, backtracking LR method, generalized LR (GLR), the Earley algorithm, or any other suitable parsing method). The accelerometer can provide acceleration values in a suitable unit (such as SI unit (m/s2—meter per seconds square)) on [X, Y, Z] axes to the sensor manager 304. The gyroscope can measure the rate of rotation around the local [X, Y, Z] axes of the electronic device 301 and provide the measured rate of rotation to the sensor manager 304. In an example embodiment, the gyroscope can measure the rate of rotation in radians/second. A magnetic sensor can measure the ambient magnetic field in [X, Y, Z] axes. In an example herein, the magnetic sensor can measure the ambient magnetic field in micro-Tesla (uT). A light sensor can measure the ambient light in suitable units (such as SI lux units). A pressure sensor can measure the atmospheric pressure in a suitable unit (such as millibar (hPa)). A proximity sensor can report distance measured in a suitable unit (such as millimeters, centimeters, or any other measurement units). The sensor manager 304 can also receive information related to orientation of the device 301, ambient relative humidity, ambient temperature, and other related factors.

The input module 305 acts as a communication medium between User Interface 303 and Authentication Engine 302. In particular, device drivers interface with the hardware, and provide events (e.g., keystrokes, touchscreen movements) to the input module 305. The input module 305 interfaces with the input means such as the display, keyboard, mouse, touch screen display and gathers this event data to provide to the sensor manager 304 which in turn processes (e.g., sampling, smoothing, summarizing the period using an average, averaging and if the data is duplicative, not processing it) this data and outputs it to the authentication engine 305. In an example embodiment, the input module 305 is a device driver that interfaces directly with a touch screen display.

The input module 305 can receive data from user interface 303 which can be in the form of [X, Y] coordinates of the location for each touch point on the user interface 303, number of detected touch points (i.e., the number of fingers touching the user interface 303), pressure of each detected touch point, touch area of each detected touch point, and other related data. The input module 305 can receive information about user gestures such as key-press, pinch and zoom, swipe, and any other user gestures. The input module 305 can receive this information in a raw data format or in any other suitable format. The authentication engine 302 can translate the raw data format from the input module 305 into corresponding gestures. The translation of data into corresponding gestures can be done using techniques known in the art.

The power module 306 includes hardware and software for capturing battery statistics and other related statistics. The power module 306 can collect the statistics from components in the electronic device 301 and the applications used in the device 301. These include, for example, a processor present in the device 301, the user interface 303, communication interfaces (such as Wi-Fi, Bluetooth, NFC, or any other communication interface) on device 301, memory, audio interfaces (for example, speakers and microphones), and location services (such as Global Positioning Service (GPS), or any other equivalent means). The power module 306 can also capture the current and voltage being drawn from the battery in real-time. The power module 306 can also collect the statistics from a battery driver. In addition, the power module 306 can collect statistics related to the CPU utilization, screen brightness, pixel color strength on the screen, and any other related parameter. The power module 306 can use voltage and current sensors available as part of the battery driver. When polling the kernel to retrieve these values, the most recently reported value from the battery driver is returned. In an example embodiment, the power module 306 polls the voltage every 5 seconds, the current reading is polled every 1 second and the power module 306 can take an average of the recorded values every 5 seconds. Using these readings, the power module 306 can calculate the average power consumption every 5 seconds.

The activity monitoring module 307 can monitor the activities of the user on the device 301. The activity monitoring module 307 can monitor the activities of the applications and components present on the device 301. Examples of the monitored activities include top running applications, incoming and outgoing calls, and screen-off and screen-on events. The authentication engine 302 can generate per-application/component analysis based on the information received from the activity monitoring module 307, which can be incorporated into the user models.

The electronic device 301 can comprise of a memory 308. The memory 308 can be at least one of an internal memory, an expandable memory storage means (such as an Secure Digital (SD) card, micro SD card, and other suitable expandable storage means), an external storage means, an external server, a file server, a data server, the Cloud, or any other equivalent storage means. The authentication engine 302 can store data in the memory 308. The authentication engine 302 can also fetch data from the memory 308.

In an example embodiment, the electronic device 301 can collect data using a kernel-level sensor framework, wherein the data can be collected from device drivers present in the electronic device 301 directly, hereby providing a very fine-grained monitoring of particular event(s). For example, one event could be every change in the battery level that can be used to trigger the data collection. Further, information like display brightness, which is measured by the system as real-time data, can be recorded every CPU clock cycle and then later averaged over the time period used with other measurements.

In another example, the electronic device 301 can collect data using an application-level sensor framework, wherein data can be collected using an application present on the electronic device, which can collect data using standard interfaces present in the file system of the electronic device 301. Use of the application means that the data collection does not depend on kernel runtime code modifications. The application can collect data both periodically and on the occurrence of specified events.

Figure 4:
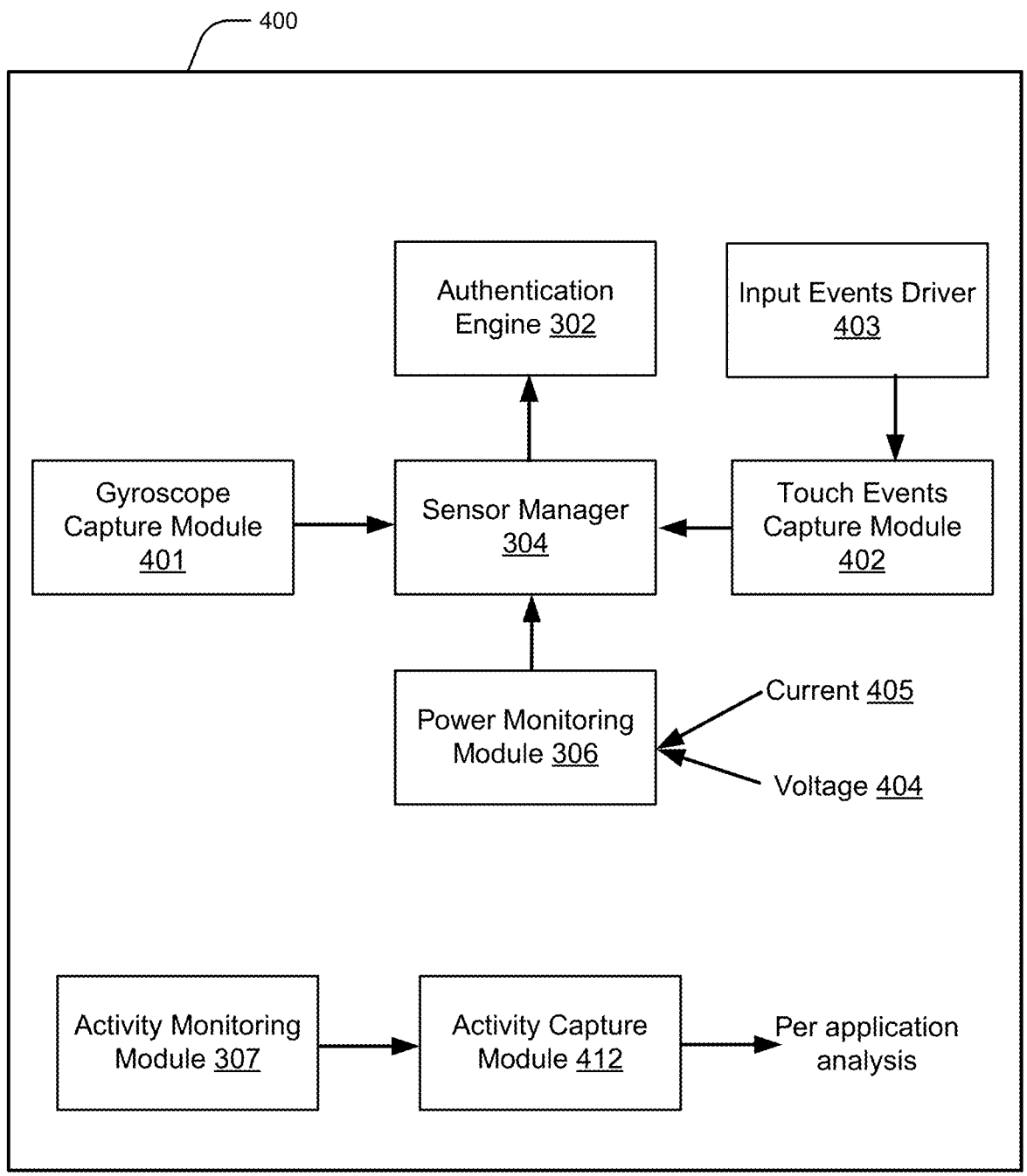
FIG. 4 depicts an example of a framework for application level sensor data collection, according to example embodiments as disclosed herein.

FIG. 4 depicts an example of a framework for application level sensor data collection. The authentication engine 302 can receive data from a gyroscope capture module 401 and a touch events capture module 402 directly or through a sensor manager 304. The gyroscope capture module 401 can provide data related to one or more gyroscopes to the sensor manager 304. The touch events capture module 402 can receive data related to the touch interface from the input events drivers 403. The authentication engine 302 can receive data from the power module 306. The power module 306 can receive data related to the power consumption of various components present in the electronic device 301. For example, the power module 306 can receive information from the CPU (Central Processing Unit) of the electronic device 301, the display of the electronic device 301, the communication interfaces present in the electronic device 301 (such as the Wi-Fi interface, Bluetooth interface, Near Field Communication (NFC), and any other interface which enables the electronic device 301 to communicate with an external entity), the memory present in the electronic device 301, the audio interfaces present in the electronic device 301 (such as a microphone, and speakers), the GPS (Global Positioning System) system, the voltage 404 and current 405 consumptions.

An activity capturing module 412 can receive inputs from the activity monitoring module 307. The activity capturing module 412 can perform per application context analysis, wherein the analysis determines the power consumption of each application, the rate of power consumption of each application, the touch and gestures used in that application. In other words, the present disclosure collects power, touch, and movement data for each application and creates a user profile for each application based on the power, touch and movement data, thereby creating an application context for the usage analysis of each user.

The application sensor framework can collect data points from the electronic device 301 using filesystem(s) such as voltage, current, battery charge, CPU usage, CPU frequency, display brightness, data uplink/downlink bytes, Memory, Audio state, and GPS state. The application sensor framework can read the input events driver 403 to collect device-wide touchscreen events which is raw data and not app-specific. The application sensor framework can use the gyroscope capture module 401 to collect gyroscope data. The application sensor framework can record the user activity on the device, such as the top running application, screen-off, and screen-on events.

Figure 5:
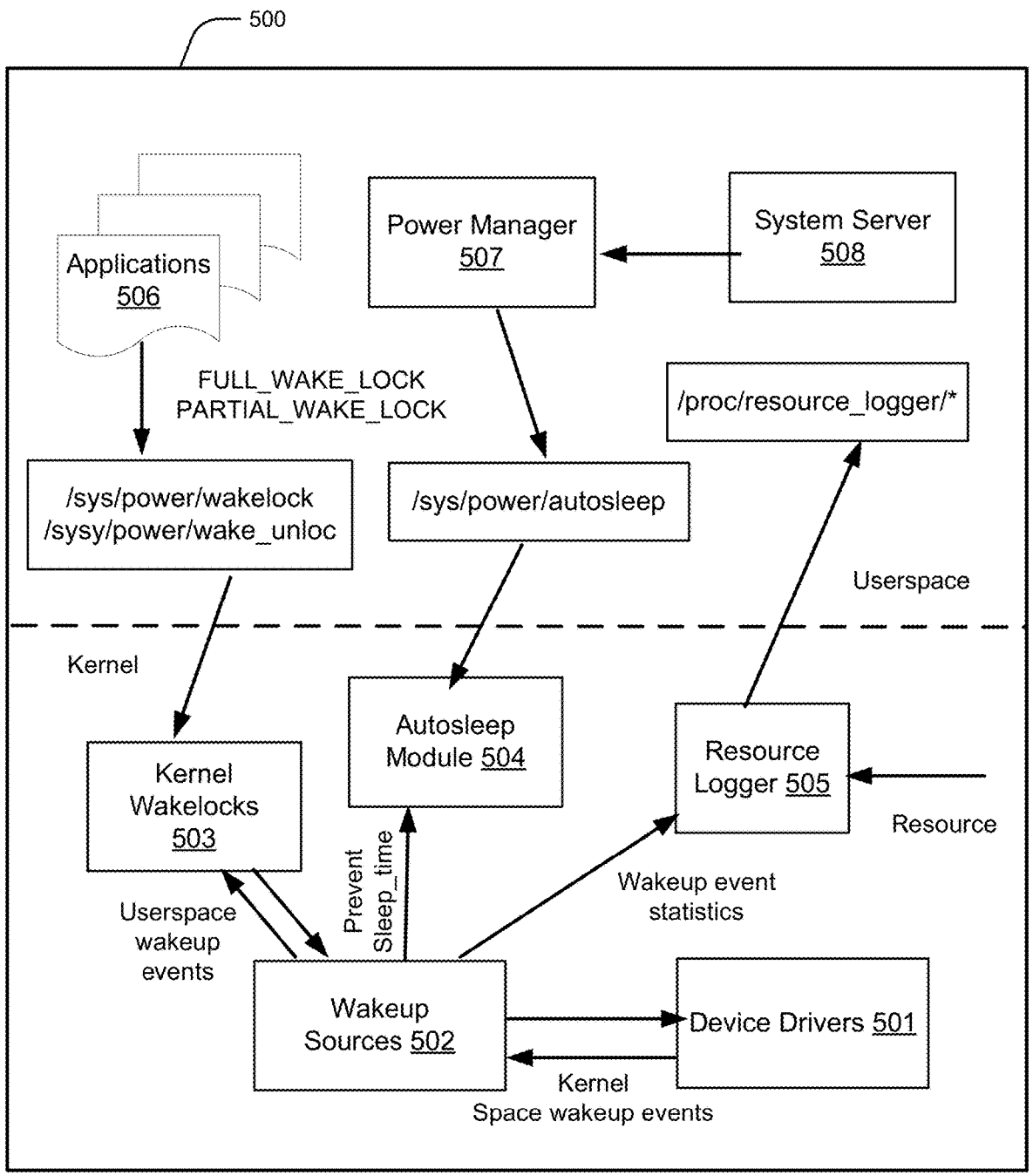
FIG. 5 depicts a framework for kernel-level sensor data collection, according to example embodiments as disclosed herein.

FIG. 5 depicts a framework for kernel-level sensor data collection according to an example embodiment. At the kernel level, device drivers 501 provide kernel space wakeup events to the wakeup sources 502. The wakeup sources 502 can exchange data related to the Userspace wakeup events with kernel wakelocks 503. The wakeup sources 502 can provide instructions such as preventing autosleep to the autosleep module 504. The resource logger 505 can receive wakeup event statistics from the wakeup sources 502. The resource logger 505 can receive information from resources present in the electronic device 301, such as the SPU, battery drivers, and other resources. On the Userspace side, the applications 506 present on the electronic device 301 can provide information about the wake status of the application to the kernel wakelocks 503.

Using the framework as depicted in FIG. 5, the authentication engine 302 can perform event driven collection. As the kernel receives the data being gathered by drivers present in the electronic device 302 directly and the kernel loops every CPU clock cycle, the authentication engine 302 can monitor particular event(s) in a fine-grained manner, and trigger the parsing threads accordingly. For example, an event could be every change in the battery level. Furthermore, data points such as brightness of display of the electronic device 301 can be collected every clock cycle and then later averaged for the time period between subsequent parsing.

The authentication engine 302 can collect data periodically using a timer. For each user, the authentication engine 302 can retrieve type information, any operations unique to the member (for example, setting the value of a field or invoking a method), and commonly encountered errors. Apart from capturing all the data, the authentication engine 302 also records the top activity in focus. This can be used to determine the context of the model, which is the name of the application that the user is currently using.

The data collected by the authentication engine 302 can be of two types—multivariate data (data comprising of more than one variable) and univariate data (data comprising of only one variable). For multivariate data, the authentication engine 302 can use a suitable technique to determine outliers such as, for example, Strangeness-based Outlier Detection method (StrOUD). For univariate data, the authentication engine 302 can use a suitable technique to determine outliers such as, for example, the discord algorithm.

For multivariate data such as data collected by the authentication engine 302 from the gyroscope, the authentication engine 302 can use a suitable means to determine outliers such as StrOUD. StrOUD can be used to detect outliers in datasets utilizing transduction. Transduction uses the process of reasoning from specific (baseline) cases to specific (testing) cases. The authentication engine 302 performs transduction by placing a point in a known sample distribution of data and using hypothesis testing to determine whether it is a good fit or not. The authentication engine 302 can use a measure of uniqueness, or strangeness for every point in the distribution. Strangeness is defined by a function that measures the uniqueness of that point. The authentication engine 302 can use transduction for classification to properly place new points in their rightful class.

The authentication engine 302 can attempt to prove or disprove one of the two following hypothesis: a null hypothesis that says that the test point is a good fit in the distribution, and an alternative hypothesis that says that the point is not a good fit. To prove or disprove the hypothesis, the authentication engine 302 can perform statistical hypothesis testing. The authentication engine 302 can perform the test by computing a measure of randomness (p-value) for the test point as a fraction of the points in the sample distribution whose strangeness is greater or equal to that of the test point. If the p-value is less than the complement of the confidence level desired for the diagnosis, the authentication engine 302 can accept the alternative hypothesis.

Figure 6:
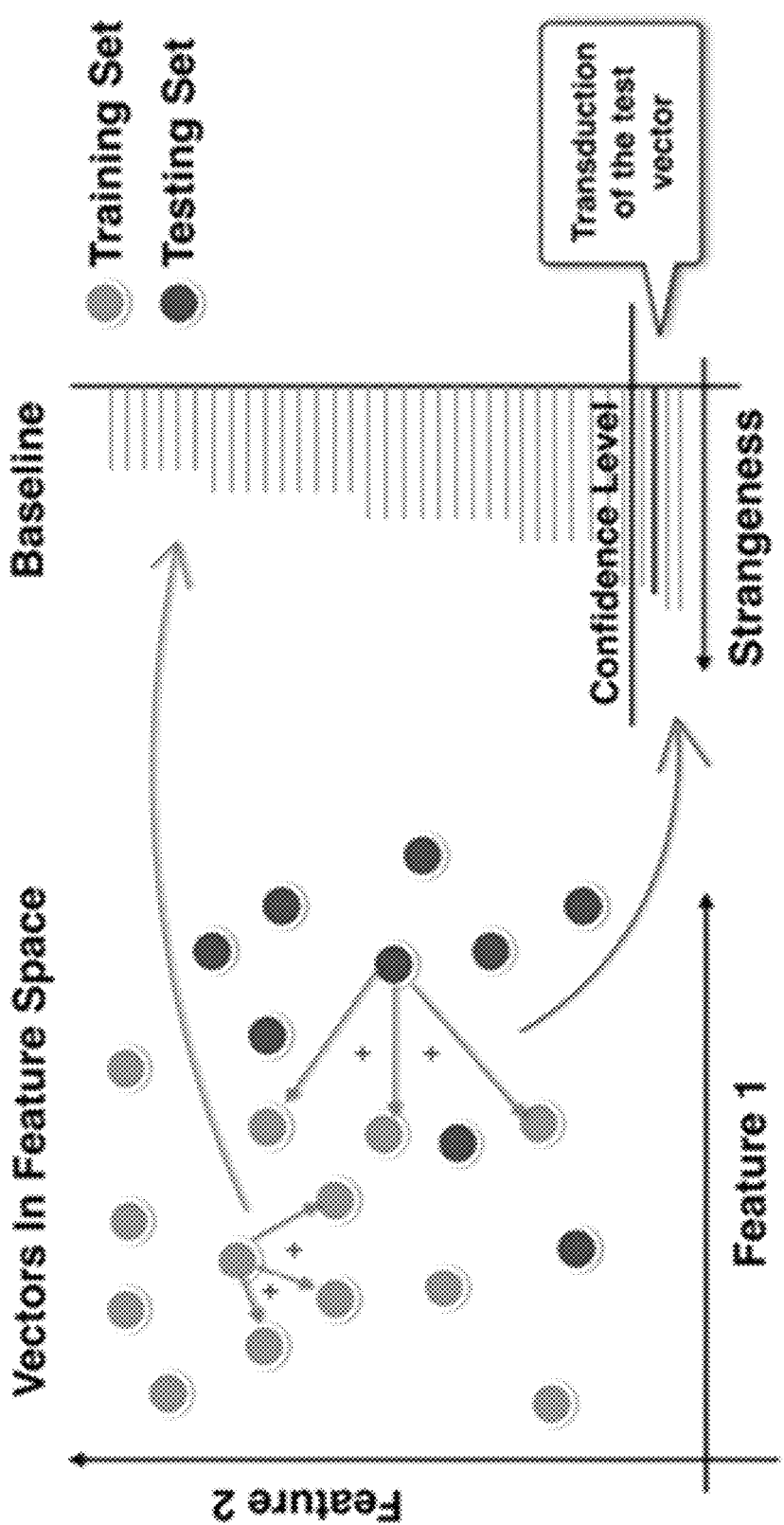
FIG. 6 depicts the process of strangeness based outlier detection, according to example embodiments as disclosed herein.

Given a sample distribution, or baseline of observations, the authentication engine 302 can compute strangeness of a point $x_j$ as a sum of the distances to k nearest points in the baseline data (as depicted in FIG. 6), as depicted in equation 1:

$$s_j = \sum_{i \in KNN} d(x_j, x_i) \tag{1}$$

Figure 7:
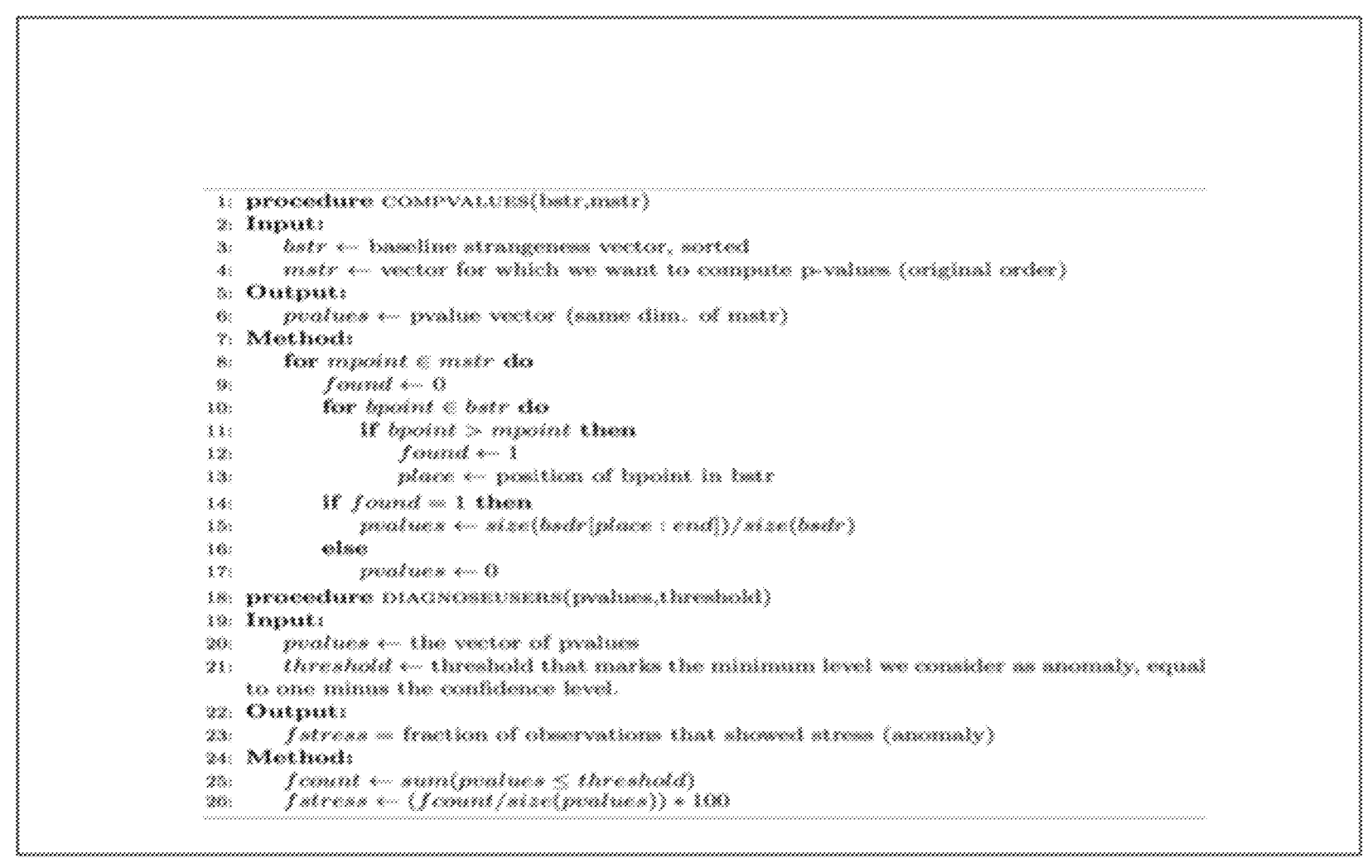

The authentication engine 302 can calculate strangeness measures for all points in the baseline and sort them in ascending order to obtain a sample distribution of strangeness, bstr. The authentication engine 302 can use StrOUD as basis for testing whether a stream of new measurements for a user comes from the same distribution collected in the baseline. For a given new point, the authentication engine 302 can compute the strangeness of the new point and measure the place of the new point on that distribution, as the fraction of points (including itself) that have strangeness equal or greater than its own. As stated before, that fraction is a measurement of randomness in the form of a p-value, which serves as the basis for hypothesis testing. FIG. 7 depicts an algorithm for p-values to calculate anomalies and probability of stress.

For every new point in the test set, its strangeness from the baseline data set, sj, is placed in the distribution of strangeness. If the point is on the tail (determined by a confidence level) of the distribution, the authentication engine 302 can consider the record as an anomaly/deviation. The fraction of anomalies (fstress) is an indication of whether the entire test set belongs to the original distribution or not. The authentication engine 302 can register the fraction of anomalies in the test set as the probability of the user committing an anomaly/deviation. The authentication engine 302 can diagnose the user as an impostor or not by setting a probability threshold on the maximum probability that can be observed and still consider the data as coming from the same distribution of the baseline. The term 'point' herein refers to a data point.

There can be metrics of goodness such as a rate of false positives and a rate of false negatives. The authentication engine 302 can produce a stress matrix where each column and row represents one user, wherein each entry in the matrix represents a probability of committing an anomaly (fstress) for the corresponding pair of baseline/test user data set. The smaller the score, the better the testing data matched the baseline.

In an embodiment herein, the authentication engine 302 can select a threshold and diagnose as positive every matrix entry whose value is bigger than the threshold. If the positive occurs in a case for which the row and column are from the same user, the authentication engine 302 can consider this a false positive (FalsePositive) (which indicates that the user is not who s/he says s/he is, while the truth says otherwise). If the positive occurs elsewhere, it is a true positive (TruePositive) (which indicates that the user is different than that of the baseline). After computing the rates at which these two events occur, the authentication engine 302 can calculate the False Reject Rate (FRR) and False Accept Rate (FAR) as shown in equation 2 below:

$$FRR=FalsePositive; FAR=1-TruePositive \qquad (2)$$

The authentication engine 302 can compute pairs of values for FRR and FAR for each threshold by varying the threshold for fstress, and plotting Receiver Operating Characteristic (ROC) for this data.

In an embodiment herein, the authentication engine 302 can utilize an individual threshold for each user. The authentication engine 302 can compute FRR and FAR per column (per user) and report the ROC for each user.

Figure 8:
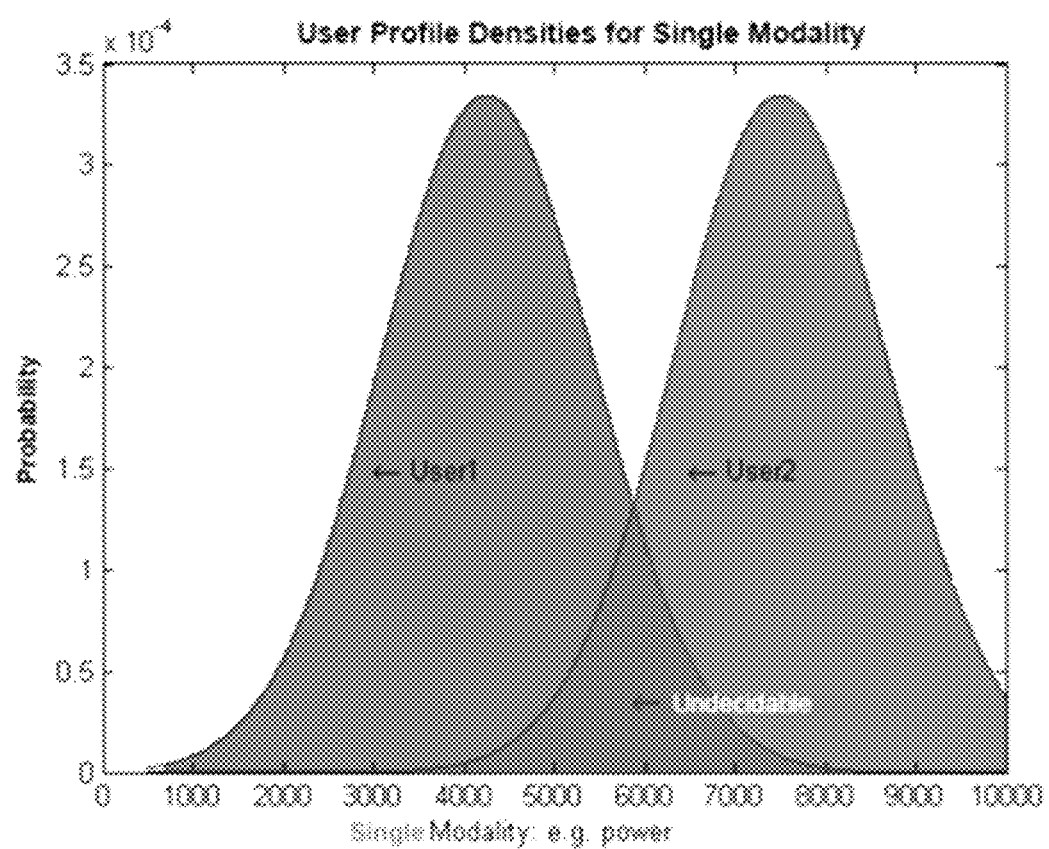
FIG. 8 depicts an example of a graph separating users using their generated profiles generated univariate time series data, according to example embodiments as disclosed herein.
Figure 9:
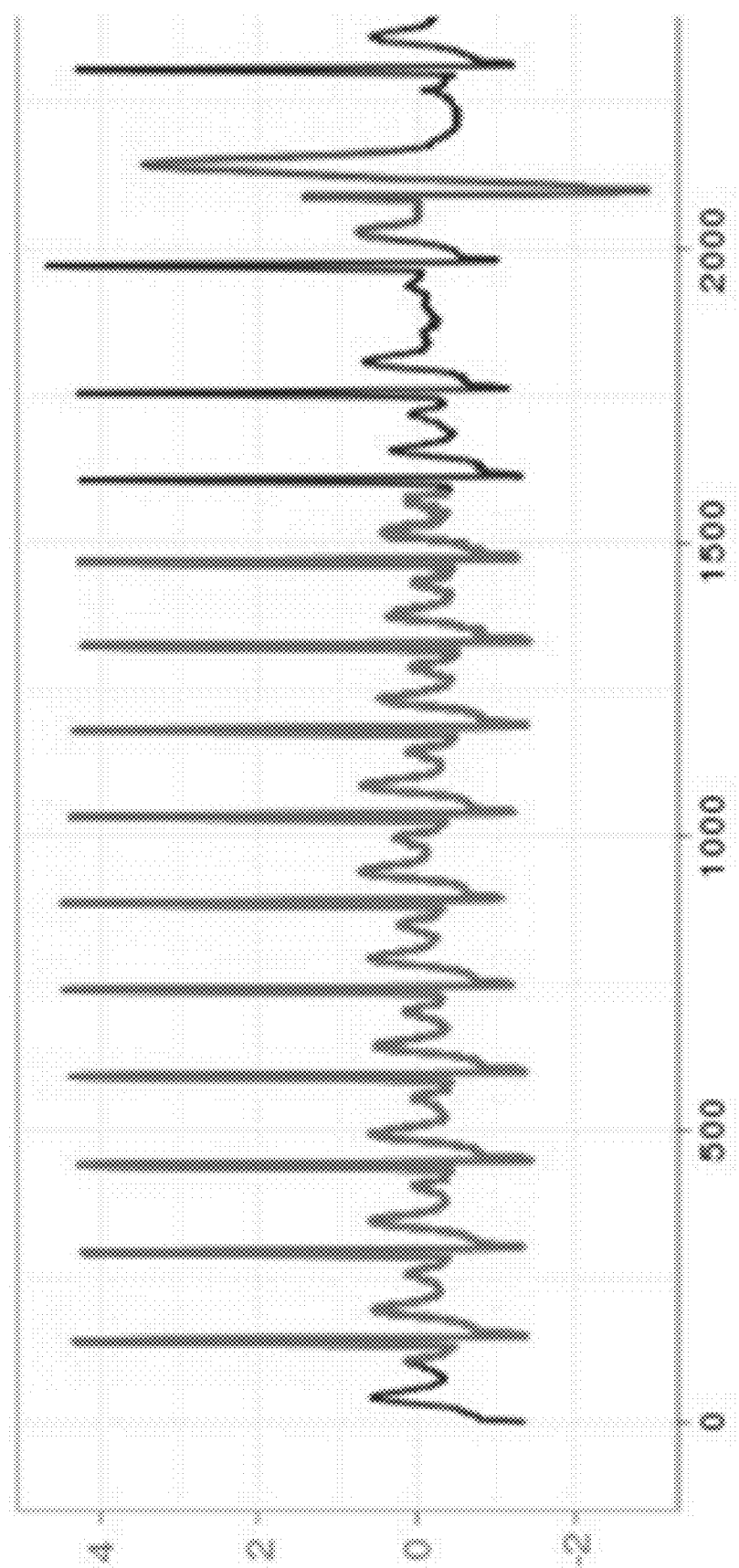
FIG. 9 depicts an example of discord in a time series, according to example embodiments as disclosed herein.

For univariate data (for example, data related to the power measurements), the authentication engine 302 can view the univariate data as a time-series (as depicted in FIG. 8) and can discover discords on the data. A discord in a time series is a subsequence of the series whose distance to the closest subsequence (of the same size) is maximal. A discord is a particularly desirable indicator of anomaly, because it only requires a very intuitive parameter for its discovery: the size of the subsequence. FIG. 9 depicts an example of a discord in a time series. The authentication engine 302 can run two loops, wherein each of the loops sweep over a sliding window equal to the chosen size of the subsequence, computing the distance of subsequences in an inner loop to a given subsequence of an outer loop (wherein comparisons are limited to subsequences whose start points are at least one window size away from each other), and recording the maximum discord. The maximum discord corresponds to the maximum distance ever found in the procedure. In an embodiment herein, the authentication engine 302 can sort the subsequences in specific orders for the outer and inner loop, and stop the inner loop when a distance between a given sequence of the outer loop and the current one in the inner loop is less than a running maximum. The authentication engine 302 can transform the time series into strings by discretizing values into an alphabet of symbols called Symbolic Aggregate Approximation (SAX). SAX transforms a time series by dividing the data into frames, calculating the mean value of the points within the frame and finding the quantile within a Gaussian distribution where the mean value lies. Each quantile is a bin that can be mapped to a discrete symbol of the alphabet.

The authentication engine 302 can obtain a distribution of measures that represent the uniqueness of a time series, as a baseline distribution. The authentication engine 302 can divide the power baseline data collected for a user in two parts. The authentication engine 302 can use the first, of size m as a basis to find discords in chunks of the second part, formed by advancing a window of size w over that part of the time series. Given a fixed size of a subsequence δ, on a given window, the authentication engine 302 can find the discord and return the distance to its closest neighbor. After doing this over the entire second part of the dataset results in a distribution of distances, the authentication engine 302 can sort the distances that in ascending order, hereinafter referred to as strangeness distribution.

When analyzing data, after receiving δ observations/data points, the authentication engine 302 can compute the distance of that set of δ observations to the first part of the baseline time series (of size m). The authentication engine 302 can then obtain a new distance to the data's closest neighbor and transduce that distance into the strangeness distribution, to analyze whether that subsequence is an anomaly or not. The authentication engine 302 can repeat this for every new observation in the test data (always considering a window of size δ that spans the current observation). Again, the authentication engine 302 can compute the fraction of anomalies f stress and is diagnosed whether the new data corresponds to an impostor or not.

The authentication engine 302 can form a stress matrix. The authentication engine 302 can use a global threshold or a per-user threshold to compute FAR and FRR. By varying the threshold, the authentication engine 302 can produce a ROC curve (which can be global or per-user).

The enforcement module 309 can enforce access control for a set of resources on the electronic device 301. The set of resources can comprise of at least one of camera(s) (pictures and video), microphone, communication interfaces, and the file system. If the authentication engine 302 makes an assessment that the user is not adequately authenticated, then the enforcement module 309 can start to progressively restrict resources from the user. The enforcement module 309 can revoke the resources on a system-wide basis. The enforcement module 309 can revoke resources on a per-application basis. Once a resource has been revoked, no application will be able to use it until the authentication engine 302 instructs the enforcement module 309 to grant access to the resource.

Figure 10:
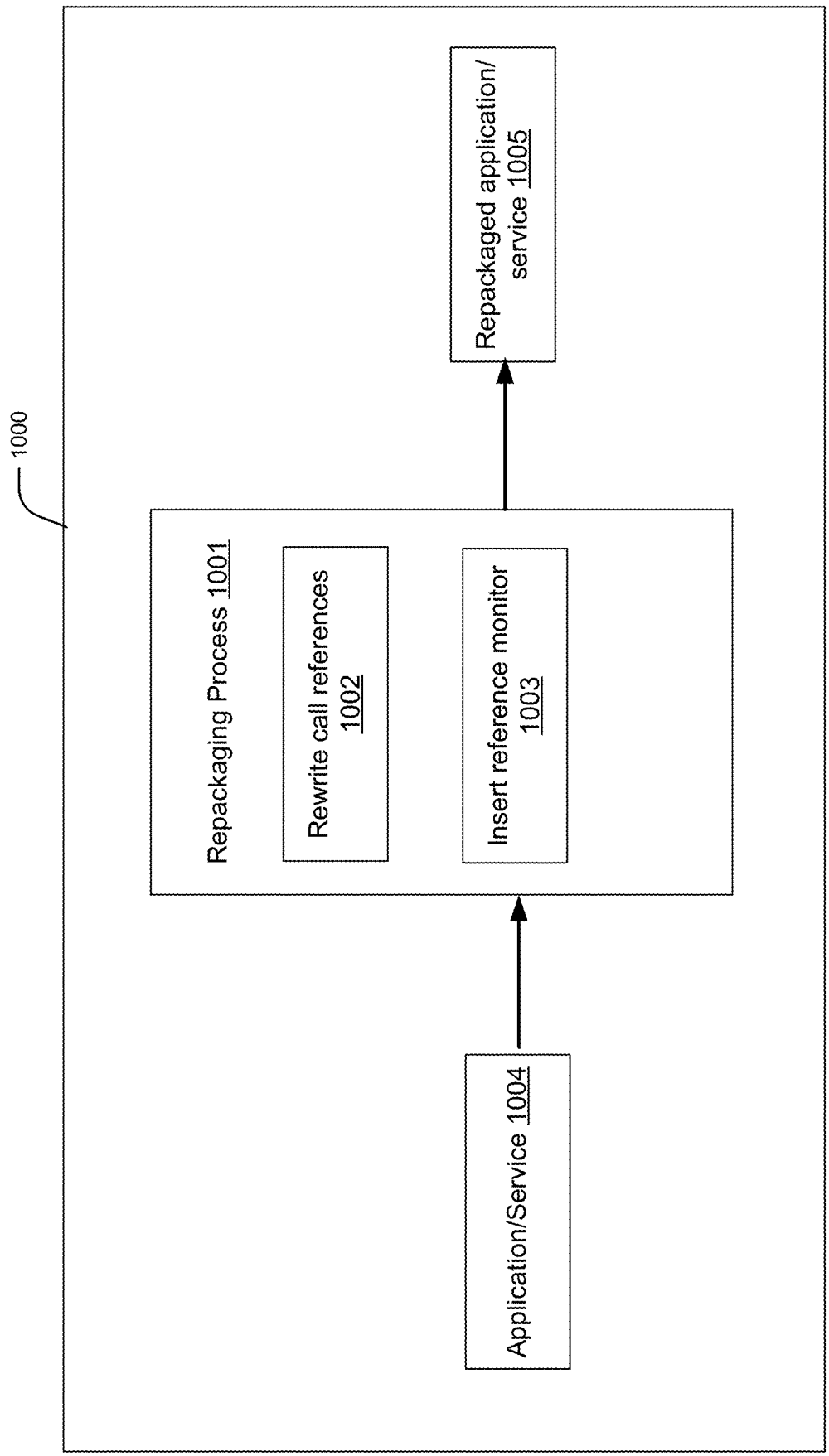
FIG. 10 depicts the application repackaging process, according to example embodiments as disclosed herein.

In an example embodiment herein, for revoking an application, the enforcement module 309 can repackage the application in order to interpose on calls within the application to the operating system (OS) for resources. In the process 1000 depicted in FIG. 10, the enforcement module 309 can performing a repackaging process 1001 on an application/service 1004 by introducing an inline reference monitor into the application/service 1004 in step 1002 and overwriting calls to specific resources with calls to the inline reference monitor in step 1003 to obtain a packaged application/service 1005. The inline reference monitor contains logic to evaluate whether or not a call to obtain a particular resource should proceed normally or in a restricted mode. The inline reference monitor examines the current access control policy for the resource as decided by the authentication engine 302 and enforces the policy. The inline reference monitor resides within the code of the application/service 1004. Calls to access protected resources are replaced with calls to the inline reference monitor. The inline reference monitor examines the current access control policy and enforces it by restricting or allowing access to resources.

In an embodiment herein, the enforcement module 309 can control resources on a system-wide basis either by monopolizing the resource or by continuously disabling or enabling the resource through the Application Programming Interface (API), wherein these resources can be controlled by an application that does not require root privileges or any system-level permission to execute. The enforcement module 309 can control these resources by initiating or terminating a Denial of Service (DoS) attack on the resource.

Figure 11:
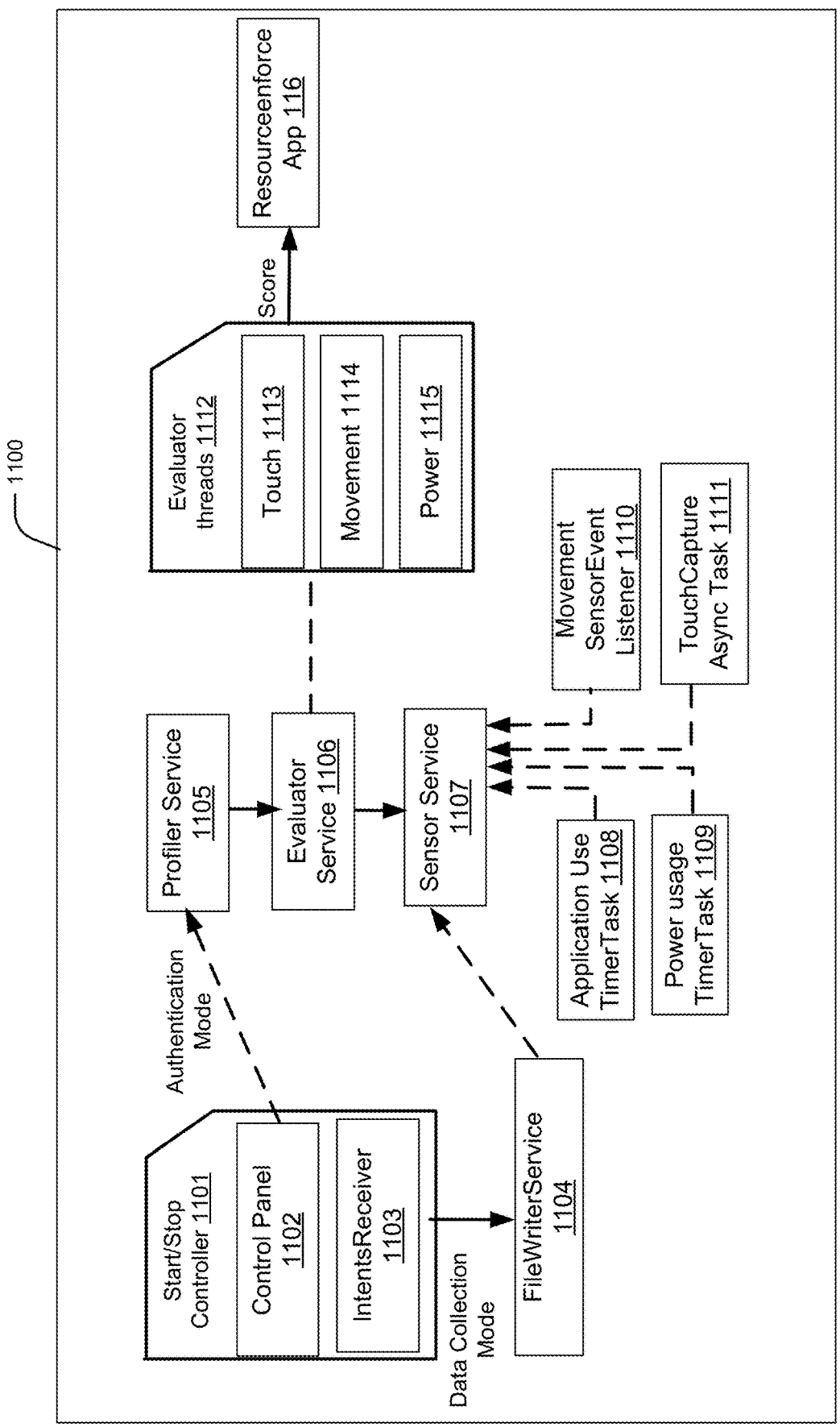
FIG. 11 depicts the structure of the application framework, according to example embodiments as disclosed herein.
Figure 12:
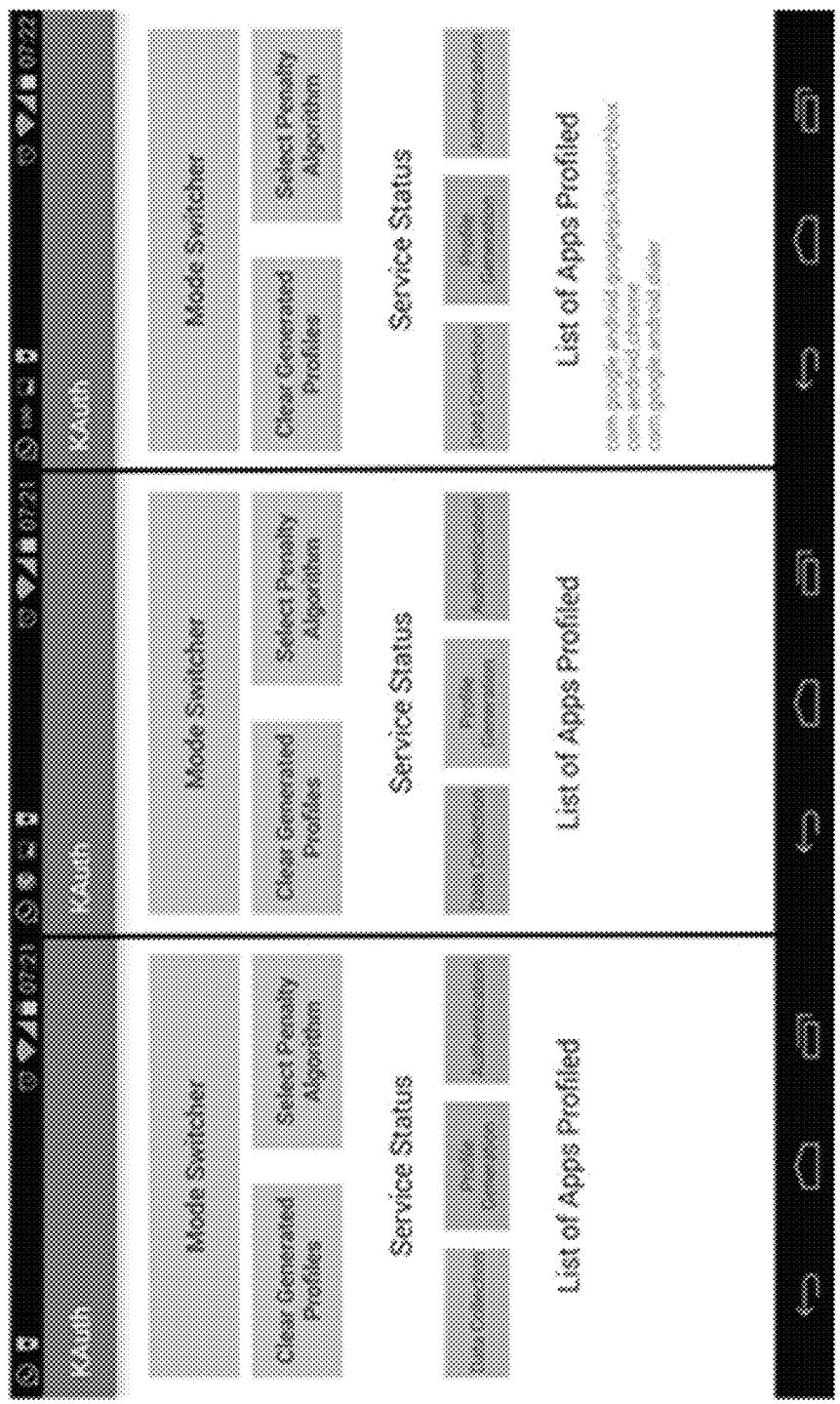
FIG. 12 depicts example UIs, according to example embodiments as disclosed herein.

FIG. 11 depicts the structure of the application framework. The electronic device 301 operates in three modes. The modes can be switched using a "Mode Switcher" interface on the UI (User Interface) (an example UI is depicted in FIG. 12). Each mode is associated with a background service that performs the corresponding tasks. These controls can be disabled in a production environment or restricted to only the system administrator/authorized user if needed.

First the user is placed in data collection mode. Once a mode is selected, it is persistent across reboots. The user can continue to use the device 301 as he would on any average day. Once the training period is completed, the mode should be switched to Authentication mode. In this mode, all the sensor data collected is used to generate baselines. In an embodiment herein, a persistent notification an be show in the status bar saying that the "Profiler service is running . . . ". The progress of profile generation is visible in the long view of the notification. During this time, the user can continue to use his device 301. Once the baselines are prepared, the device will automatically switch to evaluation mode and the authentication score will be visible in the notification.

The score generated by the user is persistent across reboots. Further, every time the user reboots or wakes the device up, the profiler is started first, in order to check if the baselines are in place, and loaded in memory. This step is necessary because the device 301 may choose to clean the memory during sleep or reboot.

Figure 13:
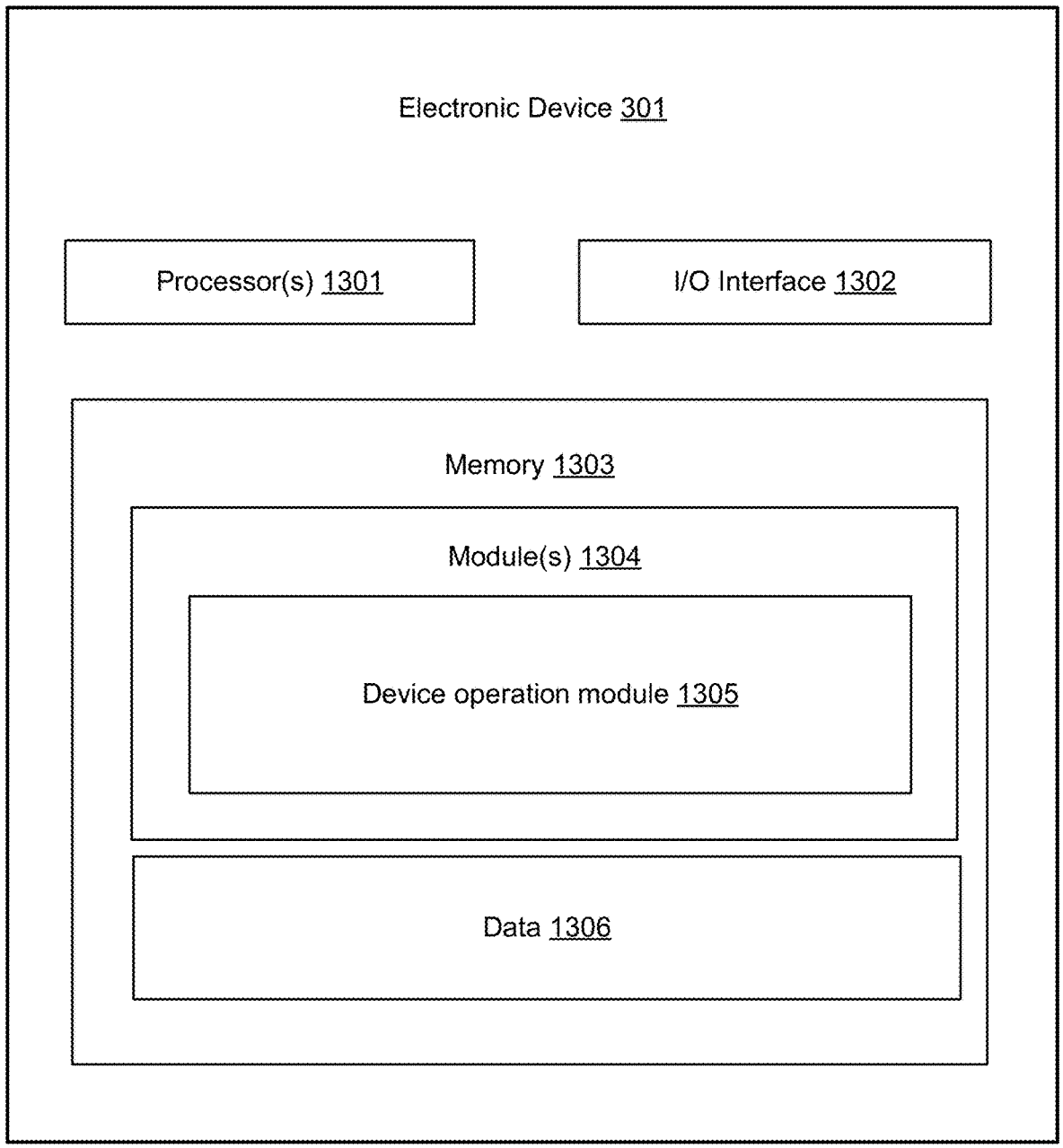
FIG. 13 illustrates a plurality of components of an electronic device for building user models and performing authentication using the user models, according to example embodiments as disclosed herein.

FIG. 13 illustrates a plurality of components of an electronic device for building user models and performing authentication using the user models. Referring to FIG. 13, the electronic device 301 is illustrated in accordance with an embodiment of the present disclosure. In an embodiment, the electronic device 301 may include at least one processor 1301, an input/output (I/O) interface 1302 (herein a configurable user interface), and a memory 1303. The at least one processor 1301 may be implemented as one or more microprocessors, microcomputers, microcontrollers, digital signal processors, central processing units, state machines, logic circuitries, and/or any devices that manipulate signals based on operational instructions. Among other capabilities, the at least one processor 1301 is configured to fetch and execute computer-readable instructions stored in the memory 1303. Memory 1303 may include Random Access Memory ("RAM"), Read Only Memory ("ROM"), Dynamic Random Access Memory ("DRAM"), and other types of memory devices known to one of skill in the art.

The I/O interface 1302 may include a variety of software and hardware interfaces, for example, a web interface, a graphical user interface such as a display screen, a physical interface, or any other interface (either software or hardware), which will allow the user to interact with the electronic device 301.

The I/O interface 1302 may allow the electronic device 301 to communicate with other devices. The I/O interface 1302 may facilitate multiple communications within a wide variety of networks and protocol types, including wired networks, for example, Local Area network (LAN), cable, etc., and wireless networks, such as Wireless LAN, cellular, Device to Device (D2D) communication network, Wi-Fi networks and any other communication means. The modules 1304 include routines, programs, objects, components, and data structures, which perform particular tasks, functions or implement particular data types. In one implementation, the modules 1304 may include a device operation module 1305. The device operation module 1305 can be configured to execute one or more tasks corresponding to the application on the electronic device 301 in accordance with embodiments as disclosed herein.

The modules 1304 include hardware and circuitry which are used to supplement applications and functions of the electronic device 301. The memory 1301, amongst other things, serves as a repository for storing data processed, received, and generated by one or more of the modules 1304. Further, the names of the other components and modules of the electronic device 301 are illustrative and need not be construed as a limitation.

In an example embodiment, the electronic device 301 may use Android as its operating system. An application embodying the present disclosure may be installed on the electronic device 301 as a system application in order to prevent the user from uninstalling the application. The application contains a BroadcastReceiver application component that statically registers an Intent filter for the android-.intent.action._BOOT_COMPLETED action string in the AndroidManifest.xml file. Once this broadcast is received, a Service application component is started. This Service creates various android.os.AsyncTask objects where each has a resource that it monitors and controls. Each AsyncTask object executes in an infinite loop until they are instructed to terminate.

In an example herein, the enforcement module 309 monopolizes the camera resource by obtaining the resource and not relinquishing it until it is instructed to do so by the authentication engine 302. The action of holding onto the camera resource precludes other applications from using it until the camera is released.

In an example herein, the enforcement module 309 can initiate an AsyncTask that controls the microphone using an android.media.MediaRecorder object that was initialized with an output path to/dev/null on the device 301. The/dev/null file is a special file that discards anything written to it, and will immediately return an end of file (EOF) character when read. Writing to/dev/null ensures that the recording file does not grow to an unmanageable size. On receiving a notification from the authentication engine 302, the enforcement module 309 can stop the recording and the microphone resource can be utilized by other applications.

In an example herein, the enforcement module 309 can enable or disable use of Bluetooth using the API level access.

To ensure an application does not use the same technique to reverse the current access control policy decision, the enforcement module 309 can constantly check the access control policy decisions from the authentication engine 302 and ensure that the current policy is enforced by repeating enforcement actions as necessary.

In an example herein, controlling an application's access to the file system requires that the application be repackaged to include an inline reference monitor and overwritten call references to resources with calls to the reference monitor. The inline reference monitor will validate access to the file system for each application. If the user is not properly authenticated to a certain degree, then any or all applications can be starved of access to the file system.

In an embodiment herein, the enforcement module 309 can make the device 301 become unresponsive to the user. This will inhibit any user action on the device 301. This condition can persist even after the device 301 is rebooted due to a system application enforcing this same behavior that makes the device 301 become unresponsive. The device 301 becoming unresponsive is accomplished by asking the operating system resident on the device 301 to perform a particular task within an infinite loop. This overloads the operating system and the device 301 will not be able to complete any meaningful actions. In addition, any resource should be able to be controlled in the same way the file system is controlled by introducing an inline reference monitor and replacing calls to the resource with calls to the inline reference monitor. In an example, where the device 301 is an Android based device, the system application enforcing this same behavior that makes the phone become unresponsive as soon as the system application receives the android.intent.action._BOOT_COMPLETED broadcast.

Embodiments herein also disclose a technique to enforce an authentication policy based on the score calculated by the authentication engine 302.

In an example herein for training the touch modality, 100 gestures of taps and 150 gestures for swipes are used to create 2 baseline models. For testing, a fixed size of 200 taps and 200 swipes from every user, genuine or imposter are used. STrOUD was applied on this set of users, comparing every user to each of the baselines as well as the common data. A confidence level of 75% is used, i.e., for diagnosing a test gesture as an accept, it needs to have a strangeness score less than $75^{th}$ percentile of all strangeness scores of the training set. This parameter, along with other algorithm parameters, was learned using grid search.

To generate the common data, baselines are prepared for each feature set using the training gestures selected. All users are compared to every baseline, and marked the gestures that fit well with at least 90% of the baselines as 'common'. These common gestures were then collected into a single dataset and used for calculating the 'common strangeness' of every test gesture. When the test gesture was accepted with a given baseline but its strangeness was greater than the 'common strangeness', the test gesture was marked as null (the gesture was removed from scoring).

For movement modality, 500 training gestures and 500 testing gestures from every user, genuine or imposter are used. Note that one gesture is window of 2 seconds. STrOUD was applied on this dataset, with a confidence level of 90%.

As a result, each test user produced a series of accepts and anomalies, for taps, swipes, and movement. A table is built that includes the rate of these anomalies for genuine user verses imposters, repeating the process for every feature set in the search space. Various metrics were considered for the ranking of feature sets:
Weighted Accept Score: Genuine User—Imposter*50 (score0).
Average of Consecutive Anomalies: Imposter—Genuine User (score1).
Imposter Anomaly Rate—Genuine User Anomaly Rate (score2).
Detection Rate—i.e.: Number of imposters with anomalies greater than the genuine users whose baselines were used for evaluation (score3).

In order to calculate the final authentications cores, the penalty scores are calculated. These are calculated by assigning penalty/reward to every 1/0 in the sequence of accept and anomalies. The best penalty and reward for taps, swipes, and movement was found to be 1.5 and 0.75 respectively. After assigning these penalties, cumulative sum was calculated, such that a series of scores within the range of 0 and 100 are obtained. Next, all the scores below a threshold to 0, and all the scores above the threshold are mapped to the range of 1-100. This threshold was found optimally for every baseline user within the range of 20-80. After mapping the penalty scores, the weighted accept score is calculated by assigning weights to bins of the mapped scores:

| Score bins | 0 | [1, 50) | [50, 60) | [60, 80) | [80,100] |
|---|---|---|---|---|---|
| Weights | 0 | 0 | 2 | 5 | 20 |

Once the weights are assigned, the cumulative average score is calculated. This is the weighted accept score, which is used to evaluate performance of each baseline's optimum threshold, as well as the overall performance of all the parameters for all users together. In order to get a single number to rank with, the following formula is used for the weighted accept score from genuine users and imposters.

Genuine User Weighted Accept Score—Imposter Weighted Accept Score*50

The imposter score is assigned a weight of 50 in order to give it higher importance than the genuine user score. The table is sorted using score0 calculated this way and selected the best feature set and algorithm parameter set. Further, it was observed by looking at the best 100 sets that the following features were most commonly appearing among these best-ranked sets:
For swipes: arc_length, ends_direction, avg_finger_diameter, avg_pressure, avg_speed
For taps: duration, ends_direction, avg_finger_diameter Embodiments herein attempt to address device portability by enabling transfer of the system functionality and profiles generated on one device to other devices. Embodiments herein enable porting to other devices by transferring the system functionality and profiles generated on one source device to other target devices. Of course, these will be considered as interim profiles on the target device and can be easily replaced/updated by running a collection and training process on the target device that will allow regeneration in an optimal manner the optimal profiles from the training data.

In an example herein, consider that porting from a Nexus 5 to a Galaxy Samsung S6. The method used to port data from Google Nexus 5 to Samsung Galaxy S6 requires analyzing the sensor readings. For power, both devices report current readings in microampere. However, Samsung Galaxy S6 readings are slightly smoother than the Nexus 5 readings. A translation can be achieved by taking mean of consecutive readings from current sensor on the Nexus 5 in a sliding window of 2. This produces the desired smoothening effect. For movement, both devices have similar sensor readings. Since the Android API is used for this sensor, this is expected to be cross-platform and similar on all hardware. For touch, first find the 5 quartiles (0th percentile, 25th percentile, 50th percentile, 75th percentile, 100th percentile) of both taps and swipes for each device, and then apply piece-wise linear transformation. The quartile mapping process identifies the 5 touch boundaries for Nexus 5, and transforms Nexus 5 data to fit into the 5 boundaries of Samsung Galaxy S6.

In FIGS. 14a and 14b, the boundaries are depicted for the 5 quartile readings for each feature on each device. One primary difference between the two devices is that the screen dimension and resolution is different, and this affects all the extracted features, including arc_length, diameter of the finger, and speed.

The following is the analysis of each feature starting with taps (as depicted in FIG. 14a):
last_start: This is time since previous gesture in milliseconds, and is the same on both devices.
duration: From FIG. 14a, it can be observed that for taps, this reports 0 milliseconds on Nexus 5, but it has a small value of 22 milliseconds on Galaxy S6. This is because for each tap, the sensor on Nexus 5 returns one single (x,y) coordinate, whereas, on Galaxy S6, the hardware returns a bunch of (x,y) coordinates which are all under the finder touching the screen. As a result, the S6 can never have 0 milliseconds. Therefore, all readings can be mapped between 0~124 on Nexus 5==>22~116 on Galaxy S6. In other words, the max. should remain the same, but the min should begin from about 20.

direction: This is angle between start and end coordinates. This is the same on both devices avg_diameter: It can be observed from FIG. 14a that the range on Nexus 5 is 3~6, whereas, on Galaxy S6 it is 3~7.6. Further, the 5 quartiles show proportional ratios. As a result, a direct trans-formation can be applied from approx. 3~6==>3~7.6. That is, the min should be the same, but the max. needs to be 25% more.

avg_pressure: FIG. 14a shows that the numbers on S6 are much smaller than their Nexus 5 equivalents. Here a piece-wise mapping can be done by applying the following transformations: 13~44==>2~13; 44~46==>13~16; 46~48==>16~32; 48~54==>32~41.

The same features for swipes (as depicted in FIG. 14b):
last_start & duration: These are time in milliseconds, and are the same on both devices.

arc_length: The arc_lengths are much greater on S6 because of higher pixel density on the touchscreen. As a result, the following transformations can be applied: 70~416==>476~983; 416~524==>983~1295; 524~672==>1295~1637; 672~1809==>1637~3152.

direction: same on both devices.

avg_diameter: The following transformations need to be applied: 3~4.5==>5.3~8.2; 4.5~5==>8.2~8.8; 5~5.4==>8.8~9.5; 5.4~8.5==>9.5~11.5.

avg_pressure: 43~48==>22~50; 48~51==>50~59; 51~54==>59~69; 54~76==>69~105.

avg_speed: 0.13~0.72==>0.36~1.18; 0.72~1.44==>1.18~1.84; 1.44~2.58==>1.84~2.91; 2.58~10.19==>2.91~7.12.

Embodiments herein show that individualized parameters significantly boost the performance of the active authentication biometric modalities without becoming computationally burdensome to calculate on the end-devices. Embodiments herein are able to achieve that using a common data baseline that is produced on a server and it is then moved on the devices upon installation of the software and applied on the user profile after is generated by the data collection and training phase. Embodiments herein computed the necessary time for the generation of the common data baseline and individualized profiles when running on a server using different number of users using a single CPU on a single server. The results clearly indicate that the common data baseline process is tractable and can be performed without significant delay on a back-end server once. From that point onwards the results can be used to bootstrap any device and use the common baseline data to drive the individualized parameter calculation. Note that the more user profiles are used, the better the individualized parameters will be. Optimal values can be obtained even with as few as a hundred users.

In addition, embodiments herein perform the entire process of collecting, training, and testing of biometric modalities in real-time and without significant impact on the battery of the device.

Embodiments herein improve the accuracy of the authentication for both genuine users and imposters. Embodiments herein have increased the performance to more than 99% for True Positive Rate (TPR) (or less than 1% False Reject Rate, FRR) and False Acceptance Rate (FAR) below 0.01% for different device applications. Even when an imposter manages to "mimic" the legitimate user it does not necessarily result in being able to achieve high authentication score and even in the rare cases that it does, it lasts very little (only few events). Similarly, when the legitimate user makes mistakes, it rarely results in her dropping to the lowest authentication level thus showing that our system would perform well in practice where authentication score levels drive the policy.

Embodiments herein demonstrate using a prototype that the overall architecture remains practical and can be deployed to resource-constrained mobile devices.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A computer-implemented method for authenticating users of an electronic device, the method comprising:
   collecting data pertaining to a user of the electronic device for authentication, the collected data indicative of an interaction behavior of the user with the electronic device;
   checking for a deviation of the collected data from a behavior model of the user, the deviation indicative of an anomaly, wherein to generate the behavior model of the user, data from a plurality of users is collected to create a behavior model corresponding to each of the plurality of users, each behavior model being indicative of data uncommon between the user corresponding to the behavior model and other users in the plurality of users to separate the user corresponding to the behavior model from other users in the plurality of users;
   computing an authentication score for the user, based on:
   a penalty score to penalize the user for the anomaly; and
   a strangeness score to determine strangeness of a data point from common data, when the data point fits into a baseline generated during a training period; and
   enforcing an access control policy on the electronic device, based on the authentication score.

2. The computer-implemented method as claimed in claim 1, wherein the data collected for authentication includes at least one of touch measurements, measurements from an accelerometer, measurements from a gyroscope, and power measurements of the electronic device.

3. The computer-implemented method as claimed in claim 1, wherein the data collected for authentication includes application context determined by creating a user profile for an application hosted on the electronic device, based on power consumption of the application, a rate of power consumption of the application, and touch and gestures used in the application to provide a usage analysis of the application by the user.

4. The computer-implemented method as claimed in claim 1, wherein the access control policy comprises progressively restricting access to at least one of resources and applications hosted by the electronic device, until the user is authenticated.

5. The computer-implemented method as claimed in claim 1, wherein data collection is performed at one of an application level and a kernel level.

6. The computer implemented method as claimed in claim 1, wherein the method comprises: selecting a data collection mode to obtain data for generating baselines and behavior models to be used for authentication, wherein the electronic device is continued to be used by the user in the data collection mode; and on completion of the training period, switching to an authentication mode, wherein in the authentication mode data for authenticating the user with respect to the behavior model of the user is collected.

7. The computer-implemented method, as claimed in claim 1, wherein the method further includes
computing deviation of a new data point by an authentication engine of the electronic device;
placing the new data point in a distribution of distance by the authentication engine, according to a computed distance of the new data point; and
considering the new data point as a deviation by the authentication engine, if the place of the new data point is on the tail of the distribution.

8. A computer-implemented method of building a behavior model for authenticating a user of an electronic device, the method including:
collating information about the user, the information including application context determined by creating a user profile for an application hosted on the electronic device, based on power consumption of the application, a rate of power consumption of the application, and touch and gestures used in the application to provide a usage analysis of the application by the user;
extracting features from the collated information using a feature selection technique to reduce dimensionality of the collated information;
selecting a subset of features from the extracted features by dropping quartiles;
generating a baseline for the behavior model using the selected subset of features, wherein the baseline is based on data collected from a plurality of users to indicate data uncommon between the user corresponding to the behavior model and other users in the plurality of users to separate the user corresponding to the behavior model from other users in the plurality of users, wherein the baseline is at least indicative of usage of applications on the electronic device by the user, wherein the generating the baseline further comprises:
assigning individual weights for the selected subset of features; and
standardizing the extracted features; and
configuring the electronic device to enforce an access control policy on the electronic device, the enforcement being based on a deviation from the baseline.

9. The computer-implemented method as claimed in claim 8, wherein the method further comprises: analyzing sensor readings of another device; and
based on the analyzing, translating the behavior model to port the behavior model from the electronic device to the another device.

10. An apparatus operable to authenticate users of an electronic device, the apparatus comprising:
a processor; and
a memory device, operatively connected to the processor, and having stored thereon instructions that, when executed by the processor, cause the processor to:
collect data pertaining to a user of the electronic device for authentication, the collected data indicative of an interaction behavior of the user with the electronic device;
check for a deviation of the collected data from a behavior model of the user, the deviation indicative of an anomaly, wherein to generate the behavior model of the user, data from a plurality of users is collected to create a behavior model corresponding to each of the plurality of users, each behavior model being indicative of data uncommon between the user corresponding to the behavior model and other users in the plurality of users to separate the user corresponding to the behavior model from other users in the plurality of users;
compute an authentication score for the user, based on: a penalty score to penalize the user for the anomaly; and a strangeness score to determine strangeness of a data point from common data, when the data point fits into a baseline generated during a training period; and
enforce an access control policy on the electronic device, based on the authentication score deviation of the collected data from the behavior model of the user.

11. The apparatus as claimed in claim 10, wherein the data collected for authentication includes at least one of touch measurements, measurements from an accelerometer, measurements from a gyroscope, and power measurements of the electronic device.

12. The apparatus as claimed in claim 10, wherein the data collected for authentication includes application context determined by creating a user profile for an application hosted on the electronic device, based on power consumption of the application, a rate of power consumption of the application, and touch and gestures used in the application to provide a usage analysis of the application by the user.

13. The apparatus as claimed in claim 10, wherein, based on the one access control policy, the processor is to progressively restrict access to at least one of resources and applications hosted by the electronic device until the user is authenticated.

14. The apparatus as claimed in claim 10, wherein the processor is operable to collect the data at one an application level and a kernel level.

15. The apparatus as claimed in claim 10, wherein the processor is operable to: select a data collection mode to obtain data for generating baselines and behavior models to be used for authentication, wherein the electronic device is continued to be used by the user in the data collection mode; and on completion of the training period, switch to an authentication mode, wherein in the authentication mode data for authenticating the user with respect to the behavior model of the user is collected.

16. The apparatus as claimed in claim 10, wherein the processor is further operable to:
compute a distance of a set of data points to a first part of a baseline time series;
obtain a new distance to a closest neighbor of the set of data points;
transduce the new distance into a strangeness distribution; and
analyzing if the data point is a deviation using the transduced distance.

* * * * *